US010793727B2

(12) United States Patent
Lofftus

(10) Patent No.: US 10,793,727 B2
(45) Date of Patent: *Oct. 6, 2020

(54) MATTE PAINT COMPOSITION

(71) Applicant: Eastman Kodak Company, Rochester, NY (US)

(72) Inventor: Kevin D. Lofftus, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,870

(22) Filed: Dec. 21, 2018

(65) Prior Publication Data

US 2020/0199381 A1 Jun. 25, 2020

(51) Int. Cl.
*C09D 7/20* (2018.01)
*C09D 7/42* (2018.01)
*C09D 7/40* (2018.01)
*C09D 7/65* (2018.01)
*C09D 7/61* (2018.01)

(52) U.S. Cl.
CPC .............. *C09D 7/42* (2018.01); *C09D 7/69* (2018.01); *C09D 7/70* (2018.01); C09D 7/20 (2018.01); C09D 7/61 (2018.01); C09D 7/65 (2018.01)

(58) Field of Classification Search
CPC ... C09D 7/42; C09D 7/69; C09D 7/70; C09D 7/65; C09D 7/61; C09D 7/20; C09D 7/68; C09C 1/3653; C09C 1/24; C09C 1/3669; C09C 3/12; C08L 67/00; C08J 9/283; C08J 2401/02
USPC ................... 523/220; 524/188, 502
See application file for complete search history.

(56) References Cited

U.S. PATENT DOCUMENTS

| | | | |
|---|---|---|---|
| 4,384,056 A | 5/1983 | Schmidt et al. | |
| 4,539,361 A | 9/1985 | Siol et al. | |
| 4,684,675 A | 8/1987 | Collier | |
| 4,835,084 A | 5/1989 | Nair et al. | |
| 5,354,799 A | 10/1994 | Bennett et al. | |
| 5,429,826 A | 7/1995 | Nair et al. | |
| 5,541,024 A | 7/1996 | Nair et al. | |
| 5,760,122 A | 6/1998 | Susa et al. | |
| 6,726,991 B2 | 4/2004 | Kaeding et al. | |
| 6,852,376 B2 | 2/2005 | Chien et al. | |
| 8,081,385 B2 | 12/2011 | Matsumura et al. | |
| 8,240,859 B2 | 8/2012 | Asakura et al. | |
| 8,256,908 B2 | 9/2012 | Inoue et al. | |
| 8,900,669 B2 | 12/2014 | Lafleur et al. | |
| 9,188,708 B2 | 11/2015 | Takane et al. | |
| 2013/0052357 A1 | 2/2013 | Lafleur et al. | |
| 2014/0213662 A1* | 7/2014 | Boris | C08J 9/0061 514/772.5 |
| 2017/0218210 A1* | 8/2017 | Mersch | C09D 7/62 |
| 2017/0243989 A1 | 8/2017 | Koyo et al. | |
| 2017/0327416 A1 | 11/2017 | Miyamoto et al. | |
| 2018/0127614 A1 | 5/2018 | Shinke et al. | |
| 2018/0171163 A1 | 6/2018 | Wei et al. | |

FOREIGN PATENT DOCUMENTS

EP 3 278 974 2/2018

OTHER PUBLICATIONS

"High-performance Micro-Sphere Fin Silica: Sunsphere," Asahi Glass SI-Tech. Co., Ltd.
"Next generation high efficient matting agents for UV coatings," PCI Magazine, Mar. 1, 2015.
M. Nadal et al., "Specular Gloss," NIST Special Publication SP250-70 (2006).
H. Patrick et al., "NIST Robotic Optical Scatter Instrument (ROSI) and its Application to BRDF Measurements of Diffuse Reflectance Standards for Remote Sensing," Proc. SPIE vol. 8866, pp. 886615-1-886615-12 (2013).
B. Balling, "A Comparative Study of the Bidirectional Reflectance Distribution Function of Several Surfaces as a Mid-Wave Infrared Diffuse Reflectance Standard," Thesis for Air Force Institute of Technology (2009).

* cited by examiner

*Primary Examiner* — Hannah J Pak
(74) *Attorney, Agent, or Firm* — Kevin E. Spaulding

(57) ABSTRACT

A low-specular-reflectance coating composition includes a binder, a solvent, and a plurality of substantially spherical particles having a multimodal particle size distribution. The multimodal particle size distribution has two or more modes, each mode having a peak defining an associated mode particle size, wherein the distribution function includes a first mode having a first peak corresponding to a first particle size, and a second mode having a second peak corresponding to a second particle size. A ratio of the second particle size to the first particle size is between 1.7-4.0. A smallest of the mode particle sizes is greater than or equal to 1.0 microns, and a largest of the mode particle sizes is greater than or equal to 3.0 microns.

20 Claims, 11 Drawing Sheets

MATTE PAINT COMPOSITION

CROSS-REFERENCE TO RELATED APPLICATIONS

Reference is made to commonly assigned, co-pending U.S. patent application Ser. No. 16/228,853, entitled "Low specular reflectance surface," by K. Lofftus; and to commonly assigned, co-pending U.S. patent application Ser. No. 16/228,881, entitled "Method of forming a low specular reflectance surface," by K. Lofftus, each of which is incorporated herein by reference.

FIELD OF THE INVENTION

This invention pertains to the field of matte films and matte paint formulations and compositions.

BACKGROUND OF THE INVENTION

Matte surfaces are used for both practical and aesthetic reasons across a broad range of applications. How matte or glossy a surface appears is dependent on the orientation of the object to the incident light relative to the observer. Ideal matte surfaces have little to no specular reflectance and will exhibit the same level of specular reflectance, or gloss, as a function of angle and orientation. Prior art matte surfaces generally fall short of that goal for large portions of the angular space. Typically, they have an appearance which is dependent on the viewing direction, varying from the desired matte appearance with low specular reflectance and low gloss to bright as a result of undesired specular reflectance. These effects are often quite noticeable for three-dimensional objects, which generally have varying angles to the incident light and viewer. The undesired specular reflection can occur over a wide range of incidence angles, depending on the nature of the matte surface.

For incident light with angles up to 85° from the surface normal, the level of matte-ness or specular reflection can be determined by the gloss of a sample, which can be determined using standardized measurements which can be performed with commercially-available gloss meters. For grazing incidence angles (i.e., where the angle of the incident light is greater than about 80° from the normal), the incidence angle where there is an onset of significant specular reflection is a good metric. Current matte surface solutions are unable to address applications where minimizing grazing angle reflections is critical, since they are unable to suppress this effect specular reflections in this regime.

A prior art matte coating composition disclosed in U.S. Pat. No. 5,760,122 to Susa et al., entitled "Matte paint film, and matte paint composition," aims to provide surfaces having matte characteristics over a range of angles. They utilize a bimodal distribution of particles, having small particles with a diameter that is less than 2 microns and large particles with a diameter in the range of 8-50 microns. The particles are distributed within a matte film, such that most of the particles are not exposed on the surface, and the parts of the particles that are exposed is generally much less than a hemisphere. The small particles are typically distributed over the surface of the larger particles thereby effectively producing an irregular surface for the larger particles. While addressing a uniform matte appearance for angles in the range of 60-85°, they are silent on the matte appearance at angles less than 60° or larger than 85°. In their working examples, the diameter of the smaller particles is much less than 2 microns, being between 0.04-0.2 microns. Susa et al, teach that if the smaller particles are larger than 2 microns then the absorption and irregular surface reflection of incident rays at angles of 60° are insufficient. It should be noted that the surface reflection characteristics for 2 micron particles would be significantly different than those of 0.2 micron particles. Therefore, the results of Susa et al. cannot be extrapolated beyond the range of their working examples.

U.S. Pat. No. 4,384,056, to Schmidt et al., describes a composition for making lustrous surfaces by using particles having two particle sizes. Small filler particles have a size of 50-150 nm, and larger mail particles have a diameter from 1.35-3.5 times larger. Dispersions of the particles were found to form clear, lustrous, waterproof films.

U.S. Pat. No. 8,900,669 to E. Lafleur et al., entitled "Clear matte coating," discloses the use of matte surfaces made using polymer particles having two particles sizes where the first particle size is in the range of 0.05-0.49 microns and the second particle size is in the range of 0.5-30 microns. The reported D60 and D80 gloss values are more than 2× different, and the minimum reported D85 gloss was 3.6. These values represent characteristics that are far from those of an ideal matter surface. This illustrates that the mere usage of a bimodal particle size distribution is insufficient to provide angular independent gloss with ultra-low specular reflectance.

U.S. Pat. No. 4,684,675 to C. Collier, entitled "Matting lacquer, paint and light-transmitting matte film," discloses the use of two types of particles each having a diameter in the range of 10-40 microns. The particles differ in their composition and mechanical properties but are not expected to provide difference in their reflectance properties. No data is provided to access the level of matte performance provided.

There remains a need for matte surfaces with a uniform appearance across a wide range of incident light angles, and for paint compositions and a method of application for forming such surfaces. There is additionally a need for the matte surfaces to be robust and cost effective, and to be useable for either planar surfaces or complex three-dimensional objects.

SUMMARY OF THE INVENTION

The present invention represents a low-specular-reflectance coating composition, including:
  a binder;
  a solvent; and
  a plurality of substantially spherical particles having a multimodal particle size distribution;
  wherein the multimodal particle size distribution has a distribution function having two or more modes, each mode having a peak defining an associated mode particle size, wherein the distribution function including a first mode having a first peak corresponding to a first particle size, and a second mode having a second peak corresponding to a second particle size;
  wherein a mode width parameter for each of the modes is less than or equal to 1.0, the mode width parameter for a particular mode being given by a ratio of a full-width half-maximum width of the particular mode to the particle size of the particular mode;
  wherein a ratio of the second particle size to the first particle size is between 1.7-4.0; and
  wherein a smallest of the mode particle sizes is greater than or equal to 1.0 microns, and a largest of the mode particle sizes is greater than or equal to 3.0 microns.

This invention has the advantage that the low-specular-reflectance coating compositions are easily coated to form low-specular-reflectance surfaces having low gloss at a wide range of incident angles and therefore are observed to have a uniform matte appearance.

It has the additional advantage that it is easily adaptable to multiple particle and surface types, enabling formulations for multiple applications.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
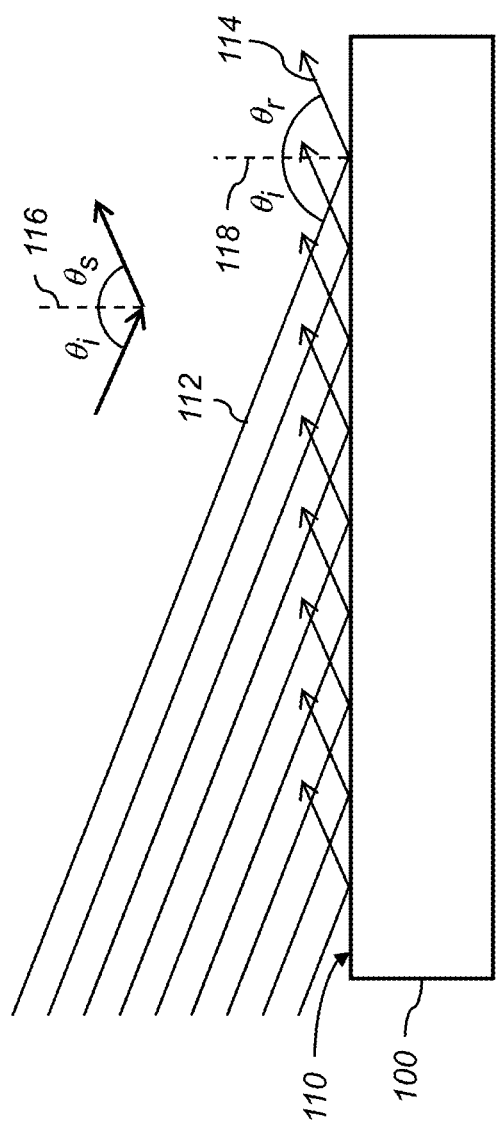
FIG. 1 illustrates specular reflection from a conventional planar surface.

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on," "over," "top," "bottom," "left," and "right" are used with reference to the orientation of the figure(s) being described. Because components of embodiments of the present invention can be positioned in a number of different orientations, the directional terminology is used for purposes of illustration only and is in no way limiting. It should be noted that, unless otherwise explicitly noted or required by context, the word "or" is used in this disclosure in a non-exclusive sense.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are generally not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense. Even though specific embodiments of the invention have been described herein, it should be noted that the present invention is not limited to these embodiments. In particular, any features described with respect to one embodiment may also be used in other embodiments, where compatible. The features of the different embodiments can be exchanged, where compatible.

It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and are not to scale for the sake of clarity. The provided figures are intended to show overall function and the structural arrangement of some embodiments of the present invention. One of ordinary skill in the art will be able to readily determine the specific size and interconnections of the elements of the example embodiments of the present invention.

Unless otherwise explicitly noted or required by context (for example, by the specified relationship between the orientation of certain components and gravity), the term "over" generally refers to the relative position of an element to another and is insensitive to orientation, such that if one element is over another it is still functionally over if the entire stack is flipped upside down. As such, the terms "over," "under," and "on" are functionally equivalent and do not require the elements to be in contact, and additionally do not prohibit the existence of intervening layers within a structure. The term "adjacent" is used herein in a broad sense to mean an element next to or adjoining another element.

As used herein with respect to an identified property or circumstance, the qualifier "substantially" refers to a degree of deviation that is sufficiently small so as to not measurably detract from the identified property or circumstance. The exact degree of deviation allowable may in some cases depend on the specific context.

The terms "particles", "substantially spherical particles", "microspheres" and "microbeads" as used herein have the same meaning and refer to materials that are spherical or nearly-spherical particles having a diameter of between 0.1 microns and 1.0 mm. Spherical or near-spherical includes particles which are suitable for providing spherical caps which are useful to provide low reflectance surfaces in accordance with the invention, and which have dimensions which are low aspect ratio and avoid jagged or irregular shapes. In some embodiments, the substantially spherical particles have an average particle aspect ratio less than about 1.25. In preferred embodiments, the average particle aspect ratio is less than about 1.1. As used herein, "aspect ratio" refers to the longest dimension of a particle divided by the shortest dimension of the particle. The aspect ratio can be evaluated by image analyses of oriented particles, or other methods known in the art. The substantially spherical particles may have surface texture or may be micro-faceted so long as they meet the criteria of aspect ratio requirements of being substantially spherical. Examples of such particles would include multi-faceted inorganic particles. Thus, term "substantially spherical" allows for irregular particle surfaces or particle surfaces having flat facets. Preferably, the facets should be randomly oriented and small enough so that they do not control the orientation of the particle in the coating.

The term "porous particle" as used herein, unless otherwise indicated, refers to particles made of polymeric or inorganic materials useful in the compositions for the present invention that have porosity in addition to meeting the requirement of being substantially spherical. Porous polymer particles can include solid continuous polymeric particles having an external particle surface and discrete compartments dispersed within the continuous solid phase, polymeric particles with an interconnected porous network whose surface is porous or continuous, as well as polymeric particles whose surface is decorated with inorganic particles such as colloidal silica. The continuous polymer binder of the porous particles is generally non-porous and has the same composition throughout that phase. That is, the continuous polymer binder is generally uniform in composition including any additives (e.g., colorants) that can be incorporated therein. In addition, if mixtures of polymers are used in the continuous polymer binder, generally those mixtures are dispersed uniformly throughout. Porous inorganic particles are typically silica, but can be any useful material that meets the need of the application. Sunsphere microspheres available from Asahi Glass Si-Tech represent one example of porous silica particles. Unless otherwise indicated, the term "porous" refers to particles wherein at least 5% of their total volume consists of pores.

Unless otherwise indicated, the term "non-porous" or "solid" refers to particles that are not specifically designed to have porosity and wherein less than 5% of their total volume consists of pores.

The term "size" refers to the modal or average diameter referring to particles or to internal compartments (pores).

The porous particles can include "micro," "meso," and "macro" pores, which according to the International Union of Pure and Applied Chemistry, are the classifications recommended for pore sizes of less than 2 nm, from 2 nm to 50 nm, and greater than 50 nm, respectively. Thus, while the porous particles can include pores of all sizes and shapes providing a suitable volume in each compartment (pore), macro pores are generally preferred. The size of the particle, the formulation, and manufacturing conditions are the primary controlling factors for pore size. However, typically the pores independently have an average diameter size of at least 100 nm and up to and including 4 microns, or more likely at least 200 nm and up to and including 2 microns. For spherical pores, this average pore size is an "average pore diameter." For non-spherical pores, the average pore size refers to the "average largest dimension." Average pore size can be determined by analyzing Scanning Electron Microscopy (SEM) images of fractured porous particles using a commercial statistical analysis software package to study the distribution of the compartments within the particles, or by manually measuring the pore diameters using the scale in the SEM images. For example, the average pore size can be determined by calculating the average diameter of at least 20 measured compartments in a single porous particle.

The porous particles used in this invention generally have porosity of at least 5% and up to and including 70%, or likely at least 10% and up to and including 50%, or more typically at least 10% and up to an including 40%, all based on the total porous particle volume. Porosity can be measured by the mercury intrusion technique.

The term "polymer binder" is used herein to define materials, including polymers, that are present in the coating formulation (and the low-specular-reflectance layer) that hold the particles within the dried layer and give it integrity and flexibility. Such materials are to be differentiated from other polymeric materials that may be used to prepare the particles described herein.

The term "void" is used to refer to a space between particles not filled with polymer binder in a low-specular-reflectance surface layer. Voids can be interconnected to form a network of voids or they can exist in isolation from other voids.

Specular reflectance has the meaning commonly known in the art, also known as regular reflection, where light at a given angle of incidence is reflected at a single reflectance angle. Within the context of the present invention, "light" means electromagnetic radiation and may include wavelengths outside of the visible range such as ultraviolet, infrared and microwave radiation.) This is distinct from diffuse reflectance, where the reflection of a ray of incident radiation from a surface is scattered at many angles. For example, FIG. 1 shows a substrate 100 having a flat surface 110. Rays of incident light 112 are shown impinging on the surface 110 at an incidence angle $\theta_i$ relative to the local surface normal 118. According to the well-known law of reflection, the reflected light 114 is reflected at a reflectance angle $\theta_r$ which is equal to the incidence angle (i.e., $\theta_r = \theta_i$). For a flat surface 110, the local surface normal 118 is the same at all points, and is equal to the global surface normal 116 for the surface 110. Thus for incident light 112 which is incident on the flat surface 110 at a particular incidence angle $\theta_i$, there will be a strong specular reflectance component at the specular reflectance angle $\theta_s = \theta_i$. Note that some of the incident light may penetrate into the substrate 100 where it will typically be scattered and may exit through back through the surface 110. Therefore, there will also typically be a diffuse reflectance component in addition to the specular reflectance component, even if the surface 110 is perfectly flat.

BRDF, is the abbreviation for bidirectional reflectance distribution function, which is used to characterize the ratio of the spectral reflectance irradiation to incident radiance as a function of angle. BRDF is used to determine the onset angle of grazing-incidence specular reflectance (as described below). Gloss has the commonly used meaning, and is the specular component of BRDF at certain specified incidence angles (e.g., 20°, 60°, 75° or 85°). The gloss values at these incidence angle are referred to in the art using the labels G20, G60, G75 and G85, respectively. Gloss values can be obtained from a full BRDF scan or from a commercially available gloss meter.

Figure 2:
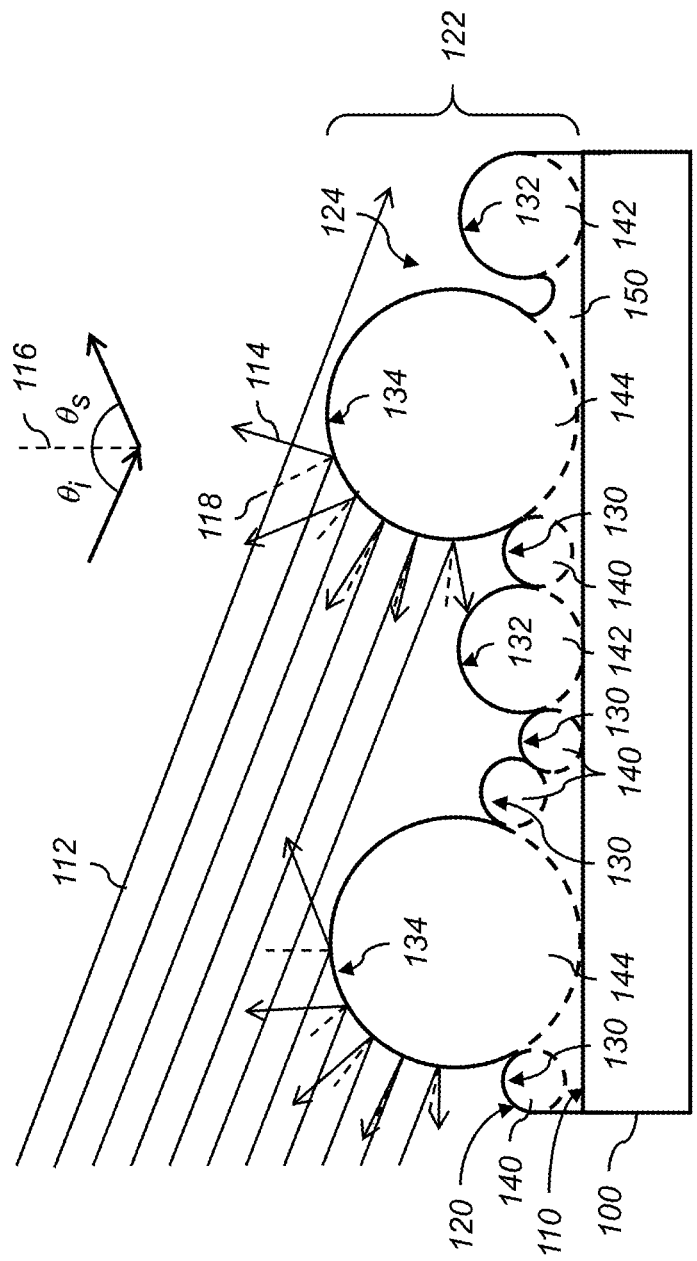
FIG. 2 illustrates surface reflection from an exemplary low-specular-reflectance surface including spherical caps formed from particles having a trimodal particle size distribution.

Turning to the present invention, low-specular-reflectance surfaces 120 are provided that have low specular reflectance/gloss values at a wide range of incidence angles as illustrated in FIG. 2. The low-specular-reflectance surfaces 120 of the present invention additionally have onset angles for grazing-incidence specular reflection greater than 85°. To achieve low specular reflectance, the low-specular-reflectance surfaces 120 have a surface structure 124 resembling a collection of substantially spherical caps 130, 132, 134. Within the context of the present disclosure a "spherical cap" corresponds to a portion of a sphere which protrudes above a given surface. Spherical caps can also be referred to as spherical domes or spherical segments. Typically, the protruding caps 130, 132, 134 may correspond to approximately half of a sphere so that they have the shape of hemispheres. However, in general, the spherical caps may be more or less than half of a sphere. As will be discussed later, in a preferred embodiment, the caps 130, 132, 134 are formed by embedding a set of substantially spherical particles 140, 142, 144 in a surface layer 122 (e.g., a surface coating deposited on a substrate 100). A binder 150 is used to adhere the spherical particles 140, 142, 144 to the surface 110 of a substrate 100. It should be noted that when the caps 130, 132, 134 are said to protrude from the surface 120, this does not imply that there is nothing that covers the surface of the particles 140, 142, 144. For example, there may be a thin coating of binder 150 that covers the particles 140, 142, 144 so long as the shape of the caps 130, 132, 134 is maintained.

The spherical caps 130, 132, 134 decrease the amount of light reflected at the specular reflectance angle $\theta_s$ by introducing variations in the local surface normal 118 such that the incident light strikes the surfaces of the spherical caps 130, 132, 134 at a variety of different incidence angles due to the curvature of the caps 130, 132, 134. Thus, the reflectance angle will be different as a function of the position that the light impinges on the caps 130, 132, 134. The reflectance from the surface 120 will therefore be more divergent, with only a small portion of the light being reflected at the specular reflectance angle $\theta_s$, which presents as a greater amount of diffuse reflectance. The amount of light reflected at the specular reflectance angle $\theta_s$ will generally be proportional to the fraction of the rays of incident light 112 which strike the surface 120 at positions where the local surface normal 118 is substantially equal to the global surface normal 116, and where the reflected light 114 does not intersect with another cap 130, 132, 134.

While using a surface coating that contains particles is well-known in the art as a method to provide "matte" surfaces, it has been discovered that providing surface coatings including a mixture of particles having particular particle size distribution characteristics is effective to provide low-specular-reflectance surfaces having a specular reflectance that is significantly lower than can be achieved with prior art matte surface coatings. The low-specular-reflectance surfaces 120 of the present invention modulate the direct reflectance such that it has a matte appearance that is substantially independent of angle of incidence and viewing angle; as characterized by visual inspection, and gloss and BRDF measurements.

In embodiments of the invention, the particle size distribution is a multimodal distribution including at least two modes corresponding to two different particle sizes, and more preferably includes three or four modes. The particle sizes for each of the modes preferably differ by a factor of between 1.7-4.0, and more preferably differ by a factor of about 2.0. The use of a mixture of different size particles in the low-specular-reflectance surfaces 120 results in a surface with a mixture of different size caps. For example, in the low-specular-reflectance surface 120 of FIG. 2 the surface layer 122 includes particles having three different particle sizes dispersed in a monolayer forming the caps 130, 132, 134. (Layer thickness greater than a monolayer are also useful in some embodiments, so long as the particles form a pattern of spherical caps on the surface and do not fill in or pack in such a way as to form a smooth surface.) In the illustrated embodiment, the medium size caps 132 have a diameter that is a factor of 2.0 larger than the small size caps 130, and the large size caps 134 have a diameter that is a factor of 2.0 larger than the medium size caps 132. Within the context of the present specification, the size of a spherical cap 130, 132, 134 corresponds to the diameter of the projected area of the portion of the particle that protrudes from the surface. Typically, the diameter of the spherical caps 130, 132, 134 will be approximately equal to the diameter of the particles assuming that approximately half of the particles protrude from the surface.

To understand why the multimodal particle size distribution of the present invention is advantaged for providing low specular reflectance, consider the example of FIG. 2. It can be seen that the spaces between the large caps 134 are filled with the small caps 130 and the medium caps 132. At high incidence angles $\theta_i$ (e.g., incidence angles greater than about 45°), the large caps 134 "shadow" many of the smaller caps 130, 132 so that the incident light rays don't strike the surface of the shadowed caps 130, 132, thereby reducing the area of the surface 120 that contributes to the specular reflection. Likewise, the medium caps 132 further shadow many of the small caps 134. Additionally, since the first surface reflectance is lower at low incidence angles relative to high incidence angles, the use of the spherical caps 130, 132, 134 means that a a greater fraction of the incident light impinges the surface 120 nearer to normal incidence (i.e., nearer to the local surface normal 116), resulting in an overall lower reflectance relative to a simple planar surface. The amount of specular reflectance is further lowered by the fact that some of the light rays that are reflected from the surface of the caps 130, 132, 134 are directed onto the surface of other nearby caps 130, 132, 134, which results in additional scattering.

The low-specular-reflectance surface 120 has a height variation that is at least half the diameter of the largest cap 134 as measured from the top of the largest cap 134 (i.e., the peak) to the lowest valley (i.e., the low point) on the surface 120. The larger caps 134 extending over the tops of smaller caps 130, 132 works to ensure that curved scattering surfaces are presented to impinging light at all grazing angles. In preferred embodiments the large caps 134 are spaced on the surface such that each large cap 134 is surrounded by smaller diameter caps 130, 132. In preferred embodiments of the present invention caps 130, 132, 134 of a particular size are randomly distributed such that any single cap size is well distributed over the surface of the substrate 100.

Figure 3:
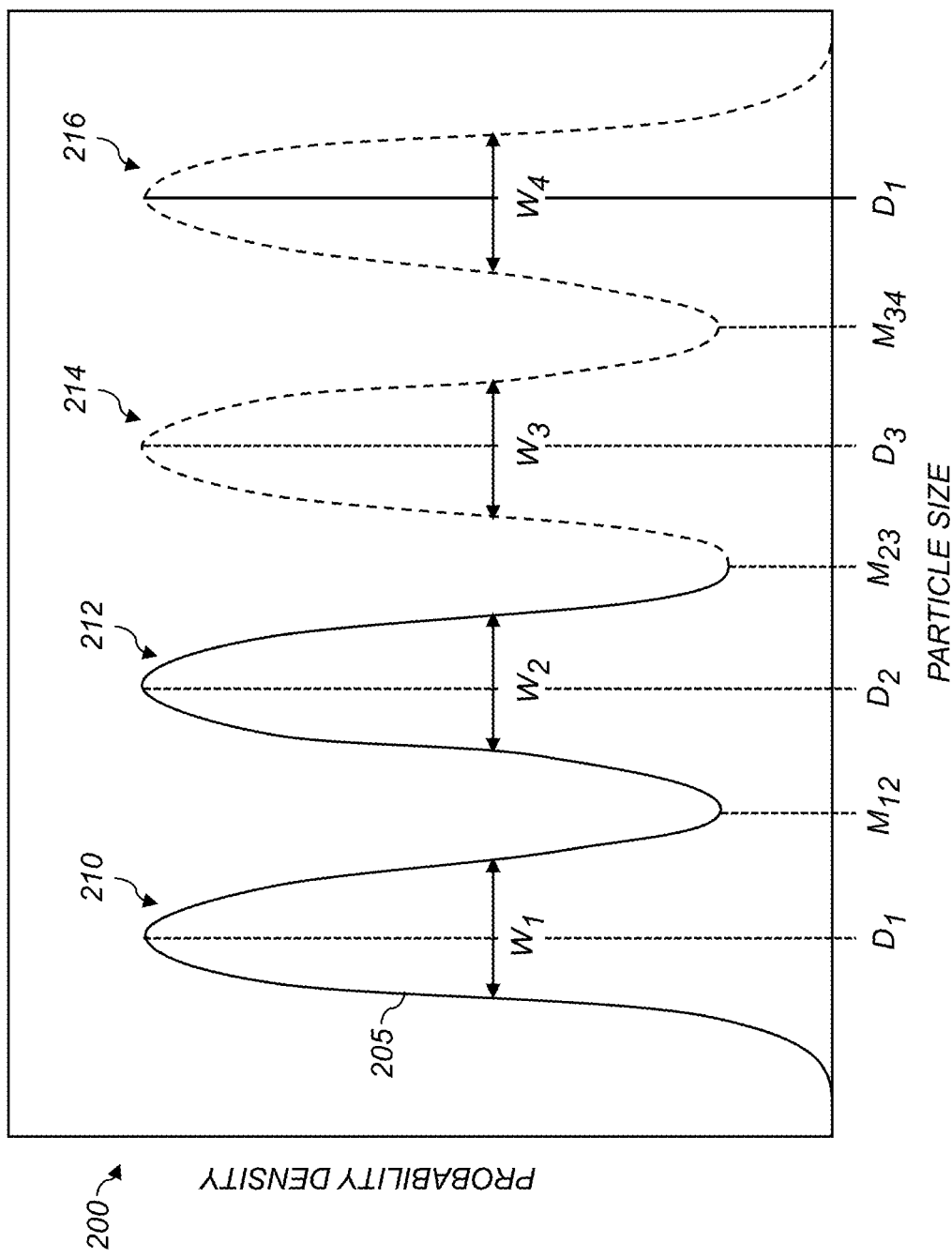
FIG. 3 illustrates an exemplary multimodal particle size distribution.

FIG. 3 illustrates an exemplary multimodal particle size distribution 200 useful to form the low-specular-reflectance surfaces 120 (FIG. 2) of the present invention. The multimodal particle size distribution 200 is characterized by a distribution function 205 having at two modes, and preferably three or four modes. The illustrated distribution function 205 includes a first mode 210 having a first peak corresponding to a first particle size $D_1$, and a second mode 212 having a second peak corresponding to a second particle size $D_2$. (As used herein, the first mode 212 refers to the mode having the smallest diameter and each subsequently numbered mode is the next largest mode in the distribution.) A ratio of the second particle size to the first particle size is preferably in the range $1.7 \leq D_2/D_1 \leq 4.0$. In an exemplary configuration, the ratio of the second particle size to the first particle size is about $D_2/D_1 \approx 2.0$. More preferably, the distribution function 205 further includes an optional third mode 214 having a third peak corresponding to a third particle size $D_3$, where a ratio of the third particle size to the second particle size is between $1.7 \leq D_3/D_2 \leq 4.0$. In some embodiments, the distribution function further includes a fourth mode 216 having a fourth peak corresponding to a fourth particle size $D_4$, where a ratio of the fourth particle size to the third particle size is between $1.7 \leq D_4/D_3 \leq 4.0$. Preferably, the largest particle size should be at least 4× the wavelength of the light being diffused based on the performance of measured samples. For visible light applications where the larges wavelength is about 750 nm, the largest particle size should preferably be at least 3.0 microns. The smallest particle size should preferably be larger than 0.7× the wavelength of the light being diffused based on Mie scattering theory, and more preferably should be larger than 1× the wavelength. In preferred embodiments, the smallest particle size is greater than or equal to 1 microns, and more preferably is greater than or equal to 2 microns.

Note that the maximum size ratio between adjacent modes is governed by the contact area of the largest particles with the coating. This contact area should be great enough that frictional force less than that required to damage the coating cannot remove the large particles from the surface. During the coating process, the meniscus and gravitational forces will draw these large particles to contact the substrate leaving a contact with the final coating of about the height of the second largest particle. For strong adhesive polymer binders, it was found that the maximum size ratio was about 4.0.

The modes 210, 212, 214, 216 are preferably narrow such that they are separated by well-defined valleys in the distribution function 205. A valley in the distribution function can be characterized by the minimum value of the distribution function 205 between adjacent modes ($M_{12}$, $M_{23}$, $M_{34}$). In preferred embodiments, the valleys between the mode peaks in the area-normalized distribution function are no more than 50% of the adjacent mode peaks. In more preferred embodiment the valleys are no more than 35% of the adjacent peaks.

The modes 210, 212, 214, 216 are characterized by respective mode widths $W_1$, $W_2$, $W_3$, $W_4$. The mode widths $W_1$, $W_2$, $W_3$, $W_4$ can be determined using any appropriate mode width calculation. In an exemplary embodiment, the mode widths $W_1$, $W_2$, $W_3$, $W_4$ are the full-width, half maximum widths of the respective modes.

In other embodiments, the mode widths can be characterized with other types of mode width parameters. For example, particle size distributions are sometimes characterized in the art by a width index for a particular mode can determined from a cumulative probability distribution function for a mode using the following formula:

$$WI_i = \frac{1}{2}\left(\frac{d_H}{d_{50}} + \frac{d_{50}}{d_L}\right) \quad (1)$$

where $WI_i$ is the width index for the $i_{th}$ mode, $d_{50}$ is the particle size where the cumulative probability distribution is 50%, $d_H$ is the particle size where the cumulative probability distribution is a specified high value (e.g., 84.1%), and $d_L$ is the particle size where the cumulative probability distribution is a specified low value (e.g., 15.9%). The width index $WI_i$ for each of the modes is preferably less than about 1.3, and more preferably is less than about 1.2. Smaller width indices are appropriate for modes that are closer together in order to provide well-separated modes, while larger width indices may be acceptable for modes which are father apart.

The width index can be difficult to determine from the multimodal distribution function 205 since it would be necessary to deconvolve the different modes. An alternate mode width parameter that can more easily be calculated is given by the following equation:

$$WP_i = \frac{W_i}{D_i} \quad (2)$$

where $WP_i$ is the mode width parameter for the $i^{th}$ mode, $W_i$ is the full-width half-maximum mode width for the $i^{th}$ mode, and $D_i$ is the particle size for the $i^{th}$ mode. The mode width parameter $WP_i$ for each of the modes 210, 212, 214, 216 is preferably less than about 1.0, and more preferably is less than about 0.60. Even more preferably the mode width parameter $WP_i$ is less than about 0.35. Smaller mode width parameter are appropriate for modes that are closer together in order to provide well-separated modes, while larger mode width parameters may be acceptable for modes which are father apart.

In an exemplary configuration, the modes 210, 212, 214, 216 are individually log-normal distributions. The multimodal particle size distribution is typically plotted with a logarithmic scaling on the x-axis, although that is not required. The distribution function 205 is preferably determined with "volume-weighted" probabilities. That is, the particle counts at each particle size are weighted by the cube of the particle diameter. In other configurations, the distribution function 205 can be unweighted so that it represents the probability that a selected particle has a particular particle size. Alternately, the probabilities can be weighted by the diameter cubed (volume-weighted) or diameter to the fourth power.

Given that the reduction of specular reflectance is primarily a property of the surface 120 of the low-specular-reflectance surface layer 122, and not a property of the volume of the layer 122, an important attribute of the surface is the projected area of the caps 130, 132, 134 on the surface 120. The projected area of any cap 130, 132, 134 (or the substantially spherical particle used to form the cap 130, 132, 134) is given by the cross-sectional area. Although it is well known that a monolayer of spherical particles cannot fully cover the surface area of a substrate 100, consideration for complex packing for a multimodal distribution of particles or caps is unnecessary to for the useful distribution function 205 to describe the present invention.

In exemplary embodiments using bimodal distribution functions, the volume percentage of the particles in the first mode 210 is preferably between 30-70% of the total volume of all the particles, and the volume percentage of the particles in the second mode 212 is between 30-70% of the total volume of all the particles. For embodiments where the multimodal particle size distribution includes three or more modes 210, 212, 214, the volume percentage of the particles in the first mode 210 is preferably between 20-60% of the total volume of all the particles, the volume percentage of the particles in the second mode 212 is between 20-50% of the total volume of all the particles; the volume percentage of the particles in the third mode 214 is between 10-40% of the total volume of all the particles, and the volume percentage of the particles in the fourth mode 216 is between 5-20% of the total volume of all the particles. It has been found that these area coverages are particularly effective to provide improved specular reflectance characteristics.

The multimodal distribution of caps 130, 132, 134 which make up the low-specular-reflectance surface 120 can be integral with the underlying object, or applied as a surface coating or laminate over the object. In some embodiments, the surface texture/topography can be molded into a final object such that the object and the surface texture have the same composition and is an integral part of the object. In such cases, the caps 130, 132, 134 are molded features of the surface or the object. Preferred embodiments of the present invention employ a multimodal distribution of substantially spherical particles, which can be applied to the surface of an object by applying a coating solution of the particles or by laminating a thin sheet which has been previously coated with the particles. For example, coating solutions can be water-based matte paints which can be aerosol-sprayed. In other embodiments, the coating solutions are formulated for the desired coating technique. The substrates for lamination can be roll-to-roll or sheet coated. These laminate films can also include an adhesive coating on the opposite side to facilitate lamination and can be singulated to facilitate lamination.

The physical properties of the low-specular-reflectance layer 122 are improved by the use of substantially spherical particles. Non-spherical particles tend to orient in a coating with the largest two dimensions parallel to the substrate 100. When the second largest dimension is similar in magnitude to that of the largest dimension, and the largest dimension significantly exceeds smallest dimension, the reflection from the exposed part of the particle is directed and dispersed at smaller angles as if it is reflected from a much larger particle. Such non-spherical particles would not protrude above the coating as much, and would generally not provide as great a benefit of the shadow and reflectance blocking effects of the spherical particles. Additionally, the projected area of the oriented non-spherical particle is less than that of the larger particle which would result in a greater specular reflectance. A related reflectance problem of glare is introduced when the second largest dimension of the particles approaches the smallest dimension so that the particles become acicular. Preferred embodiments of the invention overcome these issues by employing substantially spherical particles. Another advantage of spherical particles is that they are very difficult to crush and they maintain their shape under stress.

Additionally, any micro facets (e.g., flat regions) on the surfaces of the particles should preferably by substantially smaller that the diameter of the particle and have a random orientation with respect to each other. The effect of micro facets is to concentrate the specular reflection from a micro facet on the particle surface into a single direction, where the reflected light from an equivalent area on the surface of a spherical particle would be dispersed over a range of angles.

Particles can be either organic or inorganic, or a mixture of both, to provide mechanical, thermal, and spectral properties as required for an a particular application. Organic polymeric particles are chosen to suite the applications. When using porous polymer particles, the Tg (i.e., the glass transition temperature) of the polymer must be chosen such that there is no flow or creep during the expected operating temperature range of the low-specular-reflectance surface. In some embodiments, porous particles from cellulose acetate are preferred, having a Tg from 135-160° C., or higher if cross-linked. In more preferred embodiments, porous polymer particles derived from acrylates are used, including those from methyl methacrylate where cross-linked polymethyl methacrylate (PMMA) has a Tg greater that 250° C.

In some embodiments, the spherical particles are adhered to the substrate 100 by a polymer binder. As noted above the particles should protrude out of coating, providing spherical caps 130, 132, 134 on the surface 120 of the low specular reflection layer 122. The binder material should be chosen to have strong adhesion to both the material of the spherical particles and the substrate 100 to be coated. The binder material is also chosen to be compatible with the coating method to be used, as well as with any associated solvent or solution requirements. For some paint compositions, the use of coupling agents improves the adhesion to the surface. For example, a silane coupling agent treatment of $SiO_2/TiO_2$ stabilizer can be used to bond with reactive paint bases.

Additional benefits can be obtained from some or all of the particles in the low-specular-reflectance layer 122 being porous particles. As is known in the art, pores act to scatter light, where the wavelength of maximum light scattering is directly related to the size of the pores. This scattering of light reduces specular reflectance, reduces retro-reflections, and can be used to increase the opacity of the low-specular-reflectance layer 122 to better optically cover the underlying substrate. Furthermore, the porosity of a particle lowers its refractive index at the surface with serves to further reduce reflectance. For instance, porous particles having 30% porosity near the particle shell will have 54% of the reflectance of solid particles for incidence angles less than 40°. Additionally, the pores can serve as "containers" for colorants (e.g., dyes or pigments) in the low-specular-reflectance layer 122, useful to either match an underlying substrate color, or to provide a portion of the color for a matte paint (i.e., a low-specular-reflectance composition).

In some embodiments, the low specular reflection layer 122 is substantially transparent. Within the context of the present disclosure, the term "substantially transparent" means that less than 4% of the light within the layer 122 is scattered or absorbed (in addition to the light lost by surface reflection which is generally less than about 5%).

An aqueous coating composition can be used in the practice of this invention to prepare the low-specular-reflectance layer 122. Such formulations are generally include a stable aqueous dispersion of particles, a solvent, and a polymer binder that serves to bind together the components of the low-specular-reflectance layer 122 and to affix them to an underlying layer or substrate upon drying. In some embodiments, the polymer binder can be chemically cross-linked. The coating formulations can optionally include relatively smaller amounts of other materials, such as cross-linking agents, tinting colorants, thickeners, emulsifiers, and pH control agents.

In some embodiments, a colorant is included in the low specular reflection layer 122. The desired coloration or hue can be a specific color or can be used in combination with an opacifying colorant to offset or modify the original color of the article to cause more whiteness in the low-specular-reflectance layer 122. A wide range of tinting (or coloration) possibilities can be achieved with the addition of one or more tinting colorants (e.g., dyes or pigments) to the low-specular-reflectance layer 122. The tinting colorants will typically be present in the low-specular-reflectance layer 122 in an amount of at least 0.001 weight %, or more typically at least 0.15 weight %, based on the total dry weight of the low-specular-reflectance layer 122 (that is, the total layer solids). The tinting colorants can be incorporated into multiple locations in the low-specular-reflectance layer 122, in various proportions. Tinting colorants can be dyes or pigments that are soluble or dispersible in solvents and monomers used for making the porous particles, and in solvents used for coating. The tinting colorants can be inside or outside the porous particles or they can be incorporated into the polymer binder. For example, in some embodiments, the tinting colorants can be provided in the pores of porous particles. Colorants can be subtractive colorants which absorb light, or additive colorants which reflecting or generate light (e.g., $TiO_2$, metallic effect pigments or fluorescent materials). Dyes are typically subtractive, while pigments can be either additive or subtractive.

In an exemplary embodiment, the low-specular-reflectance layer 122 also includes a polymer binder (or a mixture of polymers forming the "polymer binder") in which the spherical particles and optional tinting colorants are dispersed. It is particularly useful that the polymer binder of the low-specular-reflectance layer 122: (a) is soluble or dispersible in a selected solvent (i.e., vehicle); (b) is capable of forming a stable coating composition with the particles any other additives such as tinting colorants; (c) is capable of being coated by techniques practiced in the art; (d) has film-forming properties when applied to a substrate; (e) is capable of being dried and where desired also crosslinked; and (f) has good light and heat stability.

In some embodiments, the polymer binder provides an article on a substrate 100 that has good durability. Thus, the polymer binder is useful in the composition of the low-specular-reflectance layer 122 for binding together and adhering the particles and all colorants onto the substrate 100 and to provide integrity to the applied low-specular-reflectance layer 122.

The polymer binder can include one or more organic polymers that are film forming and can be formed as a suspension or emulsion or in solution. It can include polymers that are not crosslinking and to which additional crosslinking agents are not added, or it can include polymer to which crosslinking agents are added and are thus capable of being crosslinked under appropriate conditions.

Useful polymer binders include, but are not limited to, poly(vinyl alcohol), poly(vinyl pyrrolidone), ethylene oxide polymers, polyurethanes, urethane-acrylic copolymers, other acrylic polymers, styrene-acrylic copolymers, vinyl polymers, and polyesters, silicone polymers or combinations of two or more of these organic polymers. Such polymer binders are readily available from various commercial sources or can be prepared using known starting materials and synthetic conditions. The polymer binder can be anionic, cationic or nonionic in total charge. A useful class of film-forming polymer binders includes aqueous latex polymer dispersions such as acrylic latexes that can be ionic or nonionic colloidal dispersions of acrylate polymers and copolymers. Film-forming aqueous latexes suitable for use include styrene-butadiene latexes, poly(vinyl chloride) and poly(vinylidene chloride) latexes, poly(vinyl pyridine) latexes, and poly(acrylonitrile) latexes. Examples of suitable commercially available useful polymer binders include those sold by DSM under the trade names NeoRez® A-1150, NeoCryl® A-6093, by Dow under the trade name Rhoplex® NW-1845K and by BASF under the tradenames Butofan N® S144 and Butofan® NS 222.

In some exemplary embodiments the polymer binder has a glass transition temperature Tg that is less than about 25° C., and typically is less than about 0° C. in order to make the dry low-specular-reflectance layer 122 flexible, rubbery, and crack-free. Glass transition temperature can be determined using known procedures and such values are already known for many polymers useful in this invention. For some embodiments, the polymer binder desirably has adequate flexibility and tensile strength in order to maintain integrity upon handling, especially for use with flexible substrates. For hard coat applications (e.g., automobile finish coats) the polymer binder preferably has a glass transition temperature Tg that is above about 70° C.

The polymer binder can optionally be crosslinked with a crosslinking agent that is included in the formulation of the low-specular-reflectance layer 122 and which is activated chemically with heat, radiation, or other means in order to provide enhanced integrity and wash durability of the resulting article. The crosslinking agent serves to provide improved insolubility of the low-specular-reflectance layer 122 in water and adhesion to the substrate or optional underlying layer. The crosslinking agent is a chemical having functional groups capable of reacting with reactive sites on the latex polymer under curing conditions to thereby produce a crosslinked structure. Examples of suitable crosslinking agents include multi-functional aziridines, aldehydes, and epoxides.

Drying and optional crosslinking of the polymer binder in the formulation of the low-specular-reflectance layer 122 can be accomplished by suitable means such as by heating, and various mechanisms can be employed for crosslinking the polymer binder. For example, the crosslinking can involve condensation or addition reactions promoted by heat or radiation. In one embodiment, a latex composition is used as the polymer binder. Upon heating, the latex film dries, with a crosslinking reaction taking place between the reactive side groups of the polymer chains. If the particular latex polymer used is not itself heat reactive, then suitable catalysts or crosslinking agents can be added to promote crosslinking upon heating.

The binder can be present in the low-specular-reflectance layer 122 in an amount of at least 10 volume percent and up to and including 50 volume percent, or typically at least 20 volume percent and up to and including 45 volume percent, based on the total dry volume of the components of the low-specular-reflectance layer 122. The percent volume of the binder is preferably less than the total percent volume of the particles so that the particles will protrude from the binder to provide spherical caps. More preferably the percent volume of the binder is less than about 80% of the percent volume of the particles.

Figure 4:
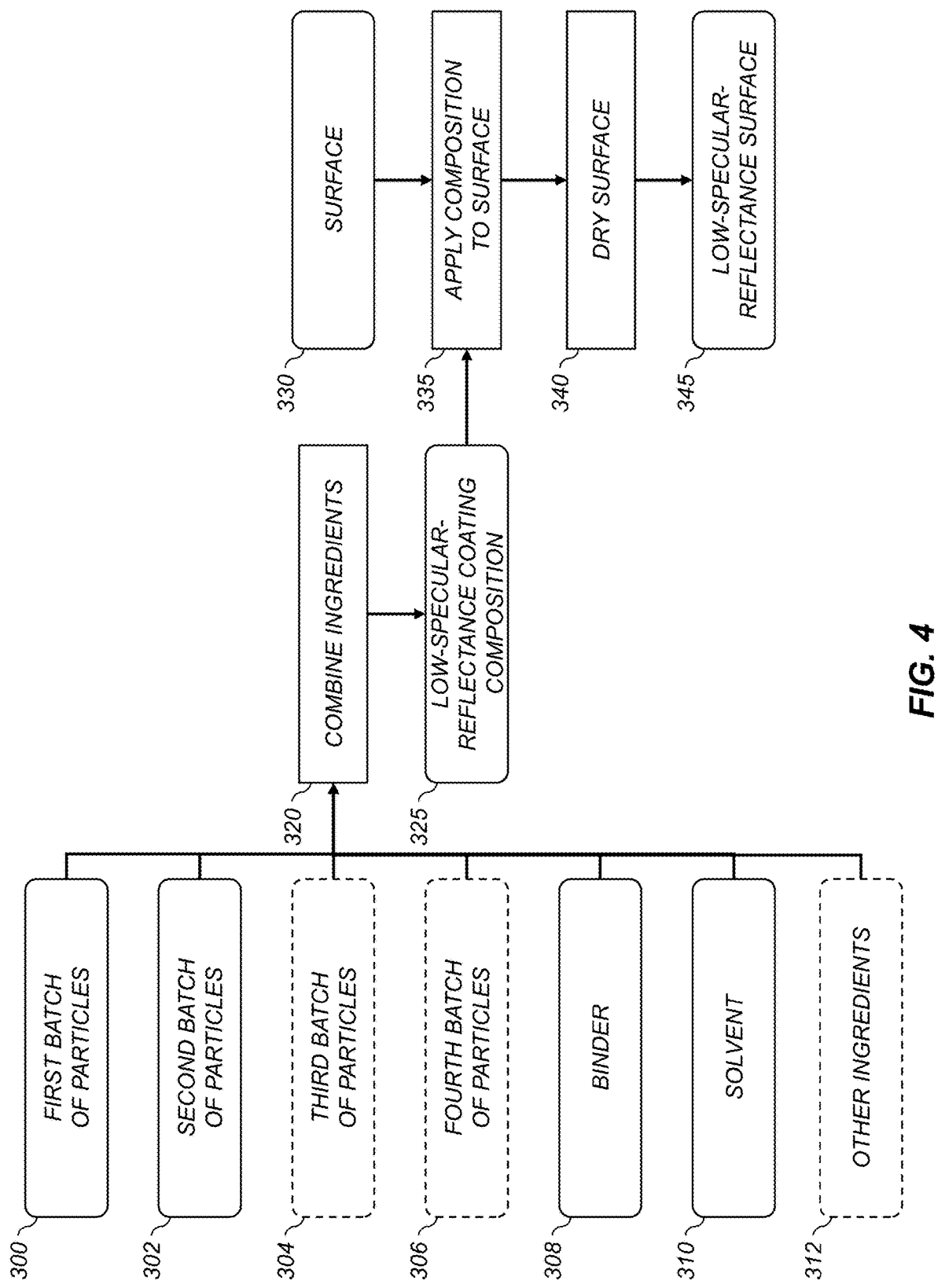
FIG. 4 is a flowchart of a method for making low-specular-reflectance surfaces in accordance with an exemplary embodiment.

FIG. 4 illustrates a flowchart for making a low-specular-reflectance coating composition 325 which can be used to form a low-specular-reflectance surface 345. The method includes providing a set of ingredients including a first batch of particles 300, and a second batch of particles 302, and optionally a third batch of particles 304 and a fourth batch of particles 306. The ingredients also include a binder 308 and a solvent 310. Other ingredients 312 can optionally be included such as tinting colorants. Preferably, the particles in the various batches of particles are substantially spherical.

The first batch of particles 300 have a first particle size distribution having a single mode with a peak corresponding to a first particle size $D_1$ and a first full-width half-maximum mode width that is less than 55% of the first particle size.

The second batch of particles 302 have a second particle size distribution having a single mode with a peak corresponding to a second particle size $D_2$ and a second full-width half-maximum mode width that is less than 55% of the second particle size. A ratio of the second particle size to the first particle size is between 1.7-4.0.

For cases where the ingredients include the third batch of particles 304, the third batch of particles have a third particle size distribution having a single mode with a peak corresponding to a third particle size $D_3$ and a third full-width half-maximum mode width that is less than 55% of the third particle size. A ratio of the third particle size to the second particle size is between 1.7-4.0.

For cases where the ingredients include the fourth batch of particles 306, the fourth batch of particles have a fourth particle size distribution having a single mode with a peak corresponding to a fourth particle size $D_4$ and a third full-width half-maximum mode width that is less than 55% of the third particle size. A ratio of the fourth particle size to the third particle size is between 1.7-4.0.

The batches of particles 300, 302, 304, 306 can be purchased from a commercial supplier or prepared using any method known in the art. Spherical polymeric particles with narrow size distributions are available from multiple suppliers. For example, Orgasol particles available from Arkema can be used in embodiments of the invention. In an exemplary embodiment, the particles 300, 302, 304, 306 are porous polymeric particles prepared using the limited coalescence particle fabrication method described in commonly-assigned U.S. Pat. No. 6,726,991 to J. Kaeding et al., entitled "Porous polymer particles and method for preparation thereof," which is incorporated herein by reference. Solid polymeric particles can be made using any method known in the art. Commonly-assigned U.S. Pat. No. 4,835,084 (Nair et al.), U.S. Pat. No. 5,354,799 (Bennett et al.), and U.S. Pat. No. 5,541,024 (Nair et al.) describe methods of forming solid polymer particles using Limited Coalescence (LC) processes. The described Limited Coalescence (LC) process is used to control the particle size and distribution and is able to provide the narrow particle size distributions that are a feature of the present invention. Inorganic particles can also be obtained from various suppliers. For example, Sunsphere silica microspheres available from Asahi Glass Si-Tech, or ferrite particles available from PowderTech can be used in embodiments of the invention. The particle size distribution can be further refined from the as-received or as-fabricated form for both polymeric and inorganic particles prior to incorporation into the low-specular-reflectance layer 122 by any means known in the art, including screening and sieving.

The solvent 310 can be water or any appropriate coating vehicle which will form a stable dispersion. In some cases, the binder 308 may be soluble in the solvent 310. In other cases, the binder 308 may be dispersed in the solvent 310. In some embodiments, the solvent 310 can include a high vapor pressure organic solvent, either alone or in combination with water to obtain the desired formulation quality. It will be understood by one skilled it the art that the choice of solvent depends on the materials of the particles, the substrate to be coated, and the coating method to be employed.

A combine ingredients step 320 combines the provided ingredients and mixes them to form the low-specular-reflectance coating composition 325. In an exemplary embodiment, the ingredients are combined in a container and thoroughly mixed. Thoroughly mixing can include rolling on a roller mill for a sufficient amount of time to ensure adequate mixing, for example for at least 12 hours. The mixture can then be stirred with a rotor stator or other device if necessary to remove and clumps or aggregated particles. For example, mixing with a rotor stator for 30-60 seconds at 5000 rpm has been used for examples of the present invention. In some cases, the formulation can be de-gassed to remove bubbles that may impact coating quality.

In an exemplary embodiment, the low-specular-reflectance coating composition 325 is a paint which is adapted to be applied to a surface 330. The low-specular-reflectance coating composition 325 generally has relatively low solids content, for example less than about 25 volume percent. If the solids content is lower, the optional other ingredients 312 can include thickeners to enhance the formulation viscosity if desired. Thickeners can also be utilized to control the rheology of the low-specular-reflectance coating composition 325 to be appropriate for the intended method to be used to apply the low-specular-reflectance coating composition 325 to the surface 330. Particularly useful rheology modifiers are Rheovis® PU 1214 (BASF) and Acrysol® G111 (Dow Chemical Company). However appropriate viscosifiers can be chosen for the solvent system used. The rheology modifiers act as binders in the dried coating.

The optional other ingredients 312 can also contain additives such as light stabilizers, preservatives, antimicrobials, biocides, surfactants, defoamers, and leveling and pH control agents, in order to provide desired properties for the low-specular-reflectance coating composition 325. It is generally desirable that the low-specular-reflectance coating composition 325 have good wetting and film-forming properties. Materials such as silicones can be incorporated into the formulations to aid in leveling them on the surface 330 to provide a smooth finish.

Preferably, a volume percent of the particles in the low-specular-reflectance coating composition 325 is between 2-30 volume percent, a volume percent of the binder in the low-specular-reflectance coating composition 325 is between 1-25 volume percent, and a volume percent of the solvent in the low-specular-reflectance coating composition 325 is between 45-97 volume percent. The volume percent of the binder should generally be less than the volume percent of the particles so that the particles will protrude from the low-specular-reflectance layer when the coating composition is applied to a surface.

An apply composition to surface step 335 is used to apply the low-specular-reflectance coating composition 325 to a surface 330, and the coated surface is dried using a dry surface step 340 to form a low-specular-reflectance surface 345. The surface 330 can be any appropriate surface material which is receptive to the low-specular-reflectance coating composition 325 and can act as a mechanical support for the coated composition. The surface material can include a rigid material such as glass, silicon, or metal. The surface material can also include a flexible material such as a polymer film or paper. Useful surface materials include organic or inorganic materials. For example, the surface material can include inorganic glasses, ceramic foils, and polymeric materials. In some embodiments the surface 330 can be a surface of a three-dimensional object. In other embodiments, the surface 330 can be the surface of a substrate. In some cases, the substrate can be adapted to be laminated onto the surface of an object. The apply composition to surface step 335 can apply the low-specular-reflectance coating composition 325 to the surface 330 using any appropriate application or coating method. For example, the low-specular-reflectance coating composition 325 can be applied using spray coating, blade coating, air knife coating, gravure coating, reverse roll coating, slot coating, extrusion hopper coating, slide coating, curtain coating, rotary screen coating, brush coating, pad coating, wrapped wire rod coating, or any other application method that would be readily apparent to one skilled in the art. When the surface 330 is a three-dimensional object, it will generally be desirable to use a coating method such as spray coating which is well-suited to applying the composition to a non-planar surface.

Preferably when the low-specular-reflectance coating composition 325 is applied to a surface 330, the particles 140, 142, 144 should be distributed in substantially a monolayer over the surface. Within the context of the present invention, particles being distributed in substantially a monolayer of particles is defined to be an arrangement of particles on a surface where the majority of the surface (i.e., more than 50% and preferably more than 75%) is covered by a single layer of particles. There may be some portions of the surface that are not covered by any particles, or some portions that are covered by more than one layer of particles. In preferred embodiments, the portions of the surface that are not covered by any particles is small (e.g., less than 5%). Within the context of the present disclosure "covered by a particle" means that the portion of the surface that is covered is under the projected area of the particle and does not imply that it is in contact with the surface. In some embodiments, the low-specular-reflectance coating composition 325 can be applied using multiple application steps each of which apply less than a monolayer (e.g., multiple passes using a spray coating process).

After application of the low-specular-reflectance coating composition 325 to the surface 330, the coated surface is dried using a dry surface step 340 to provide the low-specular-reflectance surface 345. The coated surface is generally dried by simple evaporation of water (or any other solvents) from the applied composition and, for formulations containing porous particles, from the pores of the porous particles. The drying can be accelerated by any technique known to those skilled in the art such as convection heating.

The low-specular-reflectance layer 122 (FIG. 2) of the resulting low-specular-reflectance surface 345 can have any desired overall average dry thickness. Generally, the overall average dry thickness (i.e., the thickness from the top of the largest caps 134 to the surface of the substrate 100) is approximately equal to the diameter of the largest particles 144. This is because the low-specular reflectance layer 122 is preferably a monolayer of the particles 140, 142, 144, and there will be only a small thickness of the binder 150 under the largest particles 144. The overall average thickness excludes any subbing or adhesion layers that may be present, which for the purposes of this invention will be considered part of the substrate.

The low-specular-reflectance surface 345 can also include additional conformal or semi-conformal layers coated over the top of the low-specular-reflectance layer 122 (FIG. 2) while still maintaining their low specular reflectance properties. For example, thin metallic overcoats on the low-specular-reflectance layer 122 can be used to provide the electrical, chemical and physical properties of metal. Such metalized layers have a high diffuse reflectance with no metallic luster and low specular reflectance. Metals, including aluminum, silver or chrome can be applied by any mean known in the art, including sputtering and evaporation. Other coatings can be applied over the top of the low-specular-reflectance coating to provide other corresponding physical, chemical or electrical properties in combination with the low specular reflectance property provided by the topology of the low-specular-reflectance layer 122. These overcoats can also be used for improved coating integrity and overall mechanical durability.

In some embodiments, the low-specular-reflectance coating composition 325 can be applied to a finished product (e.g., a three-dimensional object) or to a substrate to be laminated onto an object in a subsequent step. Using a flexible substrate allows for roll processing, which can be continuous, providing economy of scale and economy of manufacturing relative to flat or rigid supports. In some exemplary embodiments, the substrate can include a temporary support or support material layer, for example, when additional structural support is desired for a temporary purpose, e.g., manufacturing, transport, testing, or storage. In these example embodiments, the substrate can be detachably adhered or mechanically affixed to the temporary support. For example, a flexible polymeric support can be temporarily adhered to a rigid glass support to provide added structural rigidity during the deposition process. The glass support can be removed from the flexible polymeric support after completion of the manufacturing process. The substrate can be bare indicating that it contains no substantial materials on its surface other the material from which it is composed. The substrate can include various layers and patterned materials on the surface.

While the exemplary low-specular-reflectance surfaces described herein are fabricated by applying a composition including particles having a multi-modal particle size distribution to a surface, it will be obvious to one skilled in the art that surfaces having the same advantageous specular reflectance characteristics can be fabricated using any other appropriate method known in the art. The important feature is that the low-specular-reflectance surface have protruding caps with a multi-modal size distribution. For example, a mold can be made from a low-specular reflectance surface 345 fabricated using the method of FIG. 4. Additional low-specular-reflectance surfaces can then be fabricated using the mold (e.g., by using well-known molding methods such as compression molding, injection molding, or thermoforming, or by applying a cross-linkable formulation to the surface of the mold followed by initiating crosslinking by either exposure to radiation or a thermal source). The molded surfaces would have the same surface characteristics and specular reflectance characteristics as the original low-specular reflectance surface 345.

Particle size distribution functions can be measured for the batches of particles 300, 302, 304, 306 and the low-specular-reflectance coating composition 325 using any method known in the art. For example, they can be measured using an Electrical Sensing Zone (ESZ) counter such as the Multisizer 3 available from Beckman Coulter. These devices work by suspending the particles in a conductive fluid and sensing the volume displacement of the particles by change of resistance as they pass through an orifice. The particle size distribution functions can also be determined using a particle size analyzer such as the Sysmex FPIA-3000 automated particle size analyzer from Malvern Instruments. These devices capture images of the particles in a flow through cell and measure the particle size using an image analyzer. Another method for measuring the particle size distribution functions is using a light scattering method such as that employed by Horiba. These devices analyze the size of nonporous particles using light scattering.

For cases where it is desired to measure the particle size distribution for low-specular reflectance surfaces 345, where it is not possible to access the low-specular reflectance coating composition 325 that was applied to the surface, a different measurement method is required to determine the distribution function 205 for the multimodal particle size distribution. One exemplary method for measuring the particle size distribution function 205 is to capture an image (e.g., a photomicrograph or a scanning electron micrograph) of the low-specular reflectance surfaces 345 using appropriate lighting that makes the caps 130, 132, 134 (FIG. 2) clearly visible. The captured image can then be analyzed to detect an outline of each of the caps 130, 132, 134 using any appropriate image analysis method known in the art. A particle size can then be calculated from the detected outlines for each of the caps 130, 132, 134. A histogram can then be formed by counting the number of caps having a particle size within the histogram bins. The distribution function can then be determined by applying a desired weighting function (e.g., volume-weighting or area-weighting) and normalizing the measured histogram to determine the distribution function 205.

The specular-reflectance attributes of the low-specular reflectance surfaces 345 can be characterized using a number of different measurement techniques. One attribute which is used to characterize the reflectance characteristics of surface is the bidirectional reflectance distribution function (BRDF). The BRDF characterizes the reflected light as a function of incidence angle and reflectance angle. The BRDF can be measured using commercially available instruments such as the Schmidt Measurement Systems TSAI (Total Angle Scattering Instrument).

Gloss values, which are the specular component of BRDF at certain specified incidence angles, can be determined from the measured BRDF, or alternately can be determined using a commercially available gloss meter such as the Micro-TRI-gloss meter from BYK Gardner which can be used to measure G20, G60 and G85 (corresponding to 20°, 60° and 85° incidence angles, respectively). BYK Gardner also makes a gloss meter that reports gloss values for 75° (G75). Such devices measure gloss using well-known standard measurement as described in NIST Special Publication SP250-70, "Specular Gloss" published in 2006, which specifies the instrumentation, standards, and techniques used to measure the specular gloss of materials. It has been found that the G20, G60 and G85 gloss values are useful for characterizing the low-specular reflectance surfaces 345 of the present invention.

Figure 5:
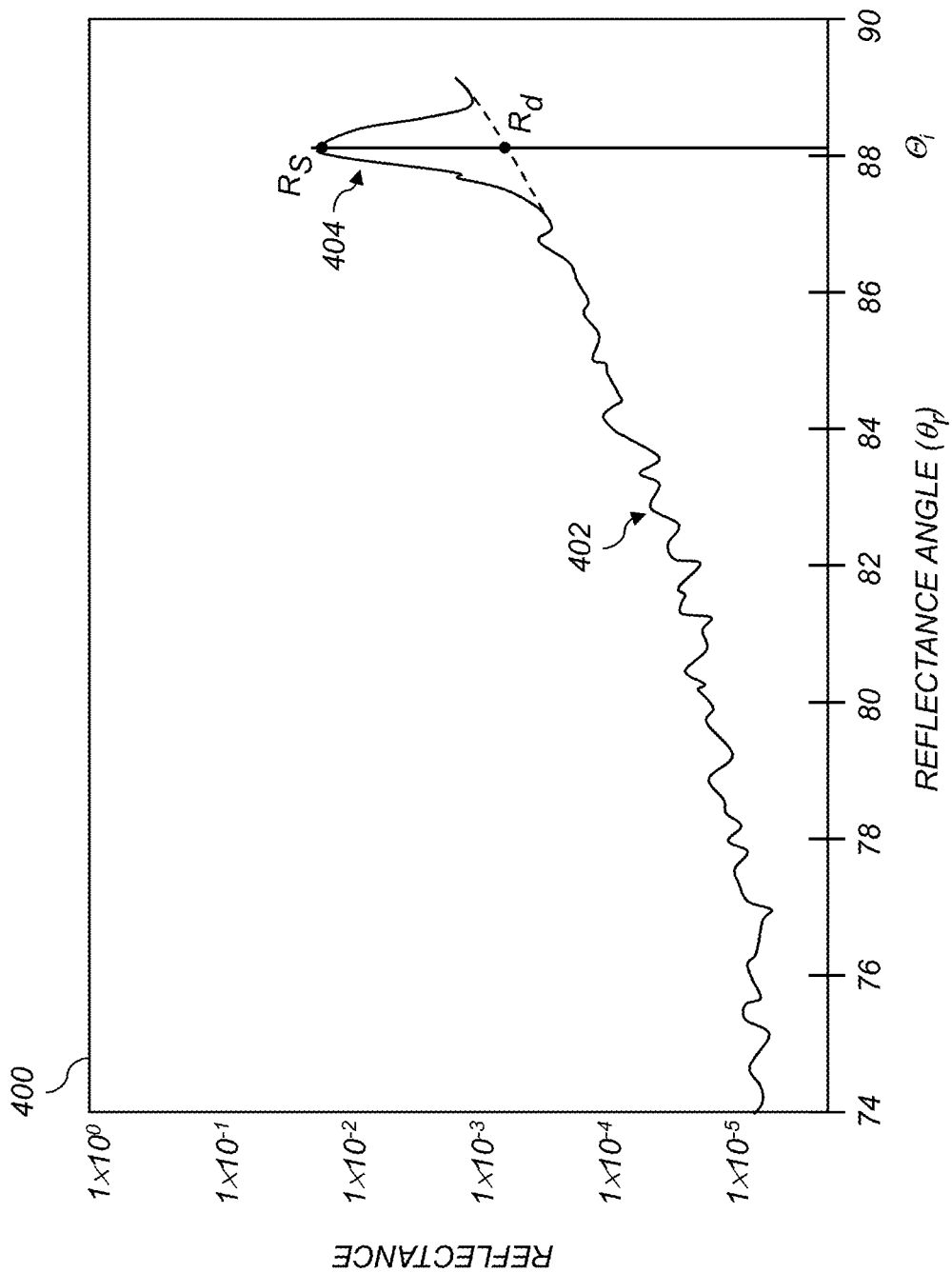
FIG. 5 is a graph illustrating specular and diffuse reflectance components for illumination at a particular incidence angle.

Another useful attribute for characterizing the low-specular reflectance surfaces 345 is the onset angle for grazing-incidence specular reflectance. As the incidence angle approaches $\theta_i=90°$, the specular reflectance from a surface typically increases sharply. An "onset angle" for this grazing-incidence specular reflectance can be determined characterizing the specular component of the reflection as a function of incidence angle (e.g., by measuring the BRDF) and determining the incidence angle where the specular component becomes significantly larger than the diffuse component. For example, the graph 400 of FIG. 5 illustrates a measured reflectance curve as a function of reflectance angle $\theta_r$ for a particular incidence angle $\theta_i$. It can be seen that the measured curve includes a diffuse reflectance 402 component and a specular reflectance peak 404, which occurs when the reflectance angle equals the incidence angle (i.e., $\theta_r=\theta_i$). Within the context of the present disclosure, the onset angle $\theta_o$ is defined to be the lowest incidence angle $\theta_i$ where the magnitude of the specular reflectance peak 404 ($R_s$) exceeds the magnitude of the diffuse reflectance 402 ($R_d$) by a factor of 3× (i.e., $R_s \geq 3 \times R_d$). The background diffuse reflectance ($R_d$) can be determined by interpolating between the measured reflectance values at angles near the incidence angle $\theta_i$ outside of the specular peak. The onset angle $\theta_0$ can be determined by calculating the ratio of $R_s/R_d$ for a series of different incidence angles $\theta_i$ and finding the smallest incidence angle where the ratio exceeds 3×. Alternatively, the onset angle can be determined by directing a laser light source onto the surface at a controlled incidence angle and viewing the pattern of reflected light. The incidence angle can be varied until a distinct specular reflectance pattern is observed. In preferred embodiments of the invention, the onset of grazing-incidence specular reflection occurs at an incidence angle of at least 85°.

The porosity of porous particles can be measured using any appropriate method known in the art. In an exemplary embodiment, the apparent density is determined using an Aerosizer device by API. The apparent density is then adjusted so that the Aerosizer modal size matches that of a respective Coulter size measurement of the same sample.

EXAMPLES

The present invention can be better understood through the following Examples. To demonstrate the impact of particle size, the particle size distribution function and other properties of the low-specular-reflectance surface a number of comparative and inventive examples were fabricated and were compared to the specular reflectance characteristics of commercially available matte paints. The majority of the particle sizes were determined using a Multisizer 2 available from Beckman Coulter, except for P2, P7 and p9, which were determined using a particle size analyzer from Horiba, and P6, which was determined using the Sysmex FPIA-3000. The porosity was determined using the Aerosizer by API in combination with the Coulter size measurements, gloss measurements were made using either the Micro-TRI-gloss or G75 gloss meters from BYK Gardner, and the onset angle for grazing-incidence specular reflectance was generated from a custom-made using an in-house BRDF apparatus. Examples were fabricated in organic solvents and water, using polymeric particles and inorganic particles. Data from the aqueous coating formulations is representative of the performance of the low-specular-reflectance surfaces made using other formulations providing the same surface properties.

To generate the aqueous coating formulations of a first set of inventive and comparative examples, particle batches of substantially spherical polymeric particles various sizes were fabricated using limited coalescence particle fabrication methods (such as that described in the aforementioned U.S. Pat. Nos. 6,726,991, 4,835,084, 5,354,799 and 5,541,024) and the composition properties were characterized. Table 1 shows the particle composition, and the measured mode particle size, mode width parameter (WP), and porosity for the particles used in the aqueous coating formulations. Mode particles size and mode width parameters were calculated from volume weighted distributions.

TABLE I

Particle Batches.

| Particle Batch | Composition | Mode Particle Size (µm) | Mode Width Parameter (WP) | Porosity (Volume %) |
|---|---|---|---|---|
| P1 | 50:50 Methyl Methacrylate-Trimethylol propane triacrylate co-polymer | 3.52 | 0.46 | 50% |
| P2 | 50:50 Methyl Methacrylate-Trimethylol propane triacrylate co-polymer | 5.12 | 0.65 | 31% |
| P3 | 50:50 Methyl Methacrylate-Trimethylol propane triacrylate co-polymer stained orange | 4.24 | 0.40 | 25% |
| P4 | 50:50 Methyl Methacrylate-Trimethylol propane triacrylate co-polymer stained black | 5.68 | 0.44 | 34% |
| P5 | 50:50 Methyl Methacrylate-Trimethylol propane triacrylate co-polymer | 11.8 | 0.24 | 25% |
| P6 | Methyl Methacrylate | 13.5 | <0.5 | 20% |
| P7 | 40:40:20 Styrene Butylacyrlate Divinyl Benzene | 22.8 | 0.44 | solid |
| P8 | 50:50 Methyl Methacrylate-Trimethylol propane triacrylate co-polymer | 25.5 | 0.25 | 25% |
| P9 | 99:1 Vinyltoluene Methacrylic Acid | 28.0 | <0.5 | solid |
| P10 | 50:50 Methyl Methacrylate-Trimethylol propane triacrylate co-polymer | 47.6 | 0.26 | 25% |

The particles from Table I were used to prepare coating compositions, which were coated on a variety of substrates. The formulation of the low-specular-reflectance coating compositions are summarized in TABLES IIa and IIb. All low-specular-reflectance layer formulations were prepared by combining the binder, the solvent, the porous or non-porous particles and less than 1% of a coating surfactant in a container. This combination was mixed manually to remove any large agglomerates, and was then mixed with a ultrasonic probe for a time appropriate for the sample size. After mixing, the rheological modifiers were added and manually mixed in. In all low-specular-reflectance layer formulations, the volume percent of the binder was less than the volume percent of the particles as shown in Table IIb. The total amount of the active component in the coating surfactant varied from 0 weight percent to 0.7 weight percent in the low-specular-reflectance layer formulations. The low-specular-reflectance layer formulations used various types of particles and colorants.

The low-specular-reflectance coating compositions were coated onto various substrates using various coating methods as described in Table IIc. The coatings were made at ambient temperatures, and dried overnight at 40° C.

coating tests available from Laneta. Gloss measurements are reported in Table III which show poor results at high incidence angles.

The coating composition of comparative example C2 was similar to that of comparative example C1 using a bimodal distribution of particles P1 and P2, and NeoCryl A-655 as the binder. Comparative example C2 additionally had 0.23 weight percent surfactant added to aid coatability. The ratio of the mode particle sizes in the distribution function of comparative example C2 is 7.95 which is outside of the range that was found to be most effective to provide low-specular-reflectance surfaces in accordance with the invention. The widely spaced modes of C2 were blade coated on a nickel-coated PET substrate. Gloss measurements are reported in Table III illustrating the poor gloss performance of particle size distributions having mode particle size ratios greater than 4.0.

TABLE IIa

Example coating formulations.

| Example | # modes | Mode 1 Particles | Mode 2 Particles | Mode 3 Particles | Mode 4 Particles | Mode 1 % Vol | Mode 2 % Vol | Mode 3 % Vol | Mode 4 % Vol |
|---------|---------|------------------|------------------|------------------|------------------|--------------|--------------|--------------|--------------|
| I1 | 2 | P1 | P6 | | | 60.5 | 39.5 | | |
| I2 | 2 | P1 | P5 | | | 55.0 | 45.0 | | |
| I3 | 3 | P1 | P5 | P8 | | 44.1 | 22.4 | 33.5 | |
| I4 | 4 | P1 | P5 | P8 | P10 | 42.6 | 22.1 | 24.1 | 11.1 |
| I5 | 3 | P1 | P6 | P7 | | 35.6 | 26.2 | 38.2 | |
| I6 | 3 | P3 + P4 | P6 | P7 | | 54.8 | 31.8 | 13.4 | |
| C1 | 1 | P2 | | | | 100.0 | | | |
| C2 | 2 | P1 | P9 | | | 60.5 | 39.5 | | |

TABLE IIb

Example coating formulations (cont.).

| Example | Weight % Binder | Volume % Binder | Weight % Particles | Volume % Particles | Total Weight % Solids |
|---------|-----------------|-----------------|--------------------|--------------------|-----------------------|
| I1 | 4.38 | 4.10 | 6.45 | 8.90 | 10.83 |
| I2 | 9.37 | 8.82 | 9.21 | 13.32 | 18.58 |
| I3 | 5.15 | 4.82 | 5.08 | 6.97 | 10.23 |
| I4 | 3.10 | 2.90 | 2.83 | 3.84 | 5.93 |
| I5 | 7.61 | 7.15 | 11.32 | 13.43 | 18.92 |
| I6 | 4.76 | 4.44 | 5.41 | 6.11 | 10.17 |
| C1 | 18.96 | 18.28 | 19.68 | 24.38 | 38.64 |
| C2 | 1.61 | 1.50 | 2.30 | 3.03 | 3.91 |

TABLE IIc

Substrate and coating method for example coating formulations.

| Example | Substrate | Coating Method |
|---------|-----------|----------------|
| I1 | Ni coated PET | aerosol |
| I2 | 4 mil PET | Doctor blade coating (4 mil gap) |
| I3 | 4 mil PET | Doctor blade coating (8 mil gap) |
| I4 | 4 mil PET | Doctor blade coating (15 mil gap) |
| I5 | White Flashing | Brush |
| I6 | Brown Flashing | Brush |
| C1 | Black Laneta Card | Doctor blade coating (4 mil gap) |
| C2 | Ni coated PET | Doctor blade coating (4 mil gap) |

The coating composition of comparative example C1 was formulated using a single batch of particles P2 in an aqueous dispersion with Sancure 2710 as the binder. Comparative example C1 was blade coated on a black card designed for

TABLE III

Measured specular reflectance properties.

| Example | # modes | G20 | G60 | G75 | G85 | Onset Angle (θo) |
|---------|---------|-----|-----|-----|-----|------------------|
| I1 | 2 | 1.9 | 1.9 | 2.0 | 2.0 | |
| I2 | 2 | 1.1 | 2.3 | 2.1 | 1.6 | 86.6 |
| I3 | 3 | 1.0 | 2.0 | 1.8 | 1.0 | 88.0 |
| I4 | 4 | 0.8 | 1.7 | 1.6 | 0.6 | 89.3 |
| I5 | 3 | 1.1 | 2.5 | 2.2 | 0.9 | |
| I6 | 3 | 0.5 | 3.0 | 2.8 | 2.2 | |
| C1 | 1 | 0.3 | 1.3 | | 11.5 | |
| C2 | 2 | 23.2 | 14.1 | 9.3 | 22.8 | |
| C3 (White Flashing) | N/A | 4.8 | 30.1 | 68.9 | 62.3 | |
| C4 (Brown Flashing) | N/A | 5.9 | 32.3 | 69.7 | 59.3 | |
| C5 (Camo Black Rust-O-Leum) | N/A | 0.1 | 1.0 | 2.8 | 3.5 | |
| C6 (Flat Black Rust-O-Leum) | N/A | 0.2 | 2.9 | 10.5 | 9.4 | |
| C7 (Dark Almond Satin Camo Black Rust-O-Leum) | N/A | 0.6 | 6.5 | 22.0 | 12.5 | |
| C8 (Camo Khaki Rust-O-Leum) | N/A | 0.4 | 1.5 | 7.7 | 8.8 | |
| C9 (Almond Gloss Krylon 1506) | N/A | 24.7 | 67.3 | 90.6 | 92.5 | |
| C10 (Fossil Staing Rust-O-Leum) | N/A | 40.9 | 77.7 | 93.9 | 91.9 | |
| C11 (Flat White Krylon) | N/A | 1.2 | 2.6 | 4.6 | 5.3 | |
| C12 (Flat White Acrylic-Enamal Krylon 3720) | N/A | 1.8 | 9.9 | 33.4 | 29.4 | |
| C13 (Flat White Enamel Rust-O-Leum) | N/A | 1.2 | 2.9 | 7.6 | 8.2 | |
| C14 (Satin White Universal Rust-O-Leum) | N/A | 3.2 | 19.7 | 55.5 | 40.0 | |

TABLE III-continued

Measured specular reflectance properties.

| Example | # modes | G20 | G60 | G75 | G85 | Onset Angle (θo) |
|---|---|---|---|---|---|---|
| C15 (Frosted Glass Rust-O-Leum) | N/A | 5.7 | 7.1 | 4.4 | 1.1 | |
| C16 (Clear Matte Krylon) | N/A | 1.6 | 6.1 | 22.2 | 18.3 | |

Inventive example I1 is a bimodal distribution of particle sizes similar to C2, however using particles P1 and P6. The binder of I1 was a mixture of NeoCryl A-655, Cycmel 373 and Acrysol G-111. 0.31 weight percent dimethyl ethanol amine was added to the water to make up the solvent blend. Additionally, 0.15 weight percent surfactant was added to the composition. The ratio of the mode particle sizes of the bimodal distribution is 3.9 which falls within the preferred range of the present invention. Spray coatings made on a nickel-coated PET substrate using inventive example I1 were observed to have a uniform matte appearance and measured to provide the measured characteristics in Table III. Inventive example I1 gives superior gloss performance as compared to coatings having single mode particle size distributions (e.g., comparative example C1), and to coatings having bimodal particle size distributions whose mode particle size are separated by than 4× (e.g., comparative example C2).

Figure 6A:
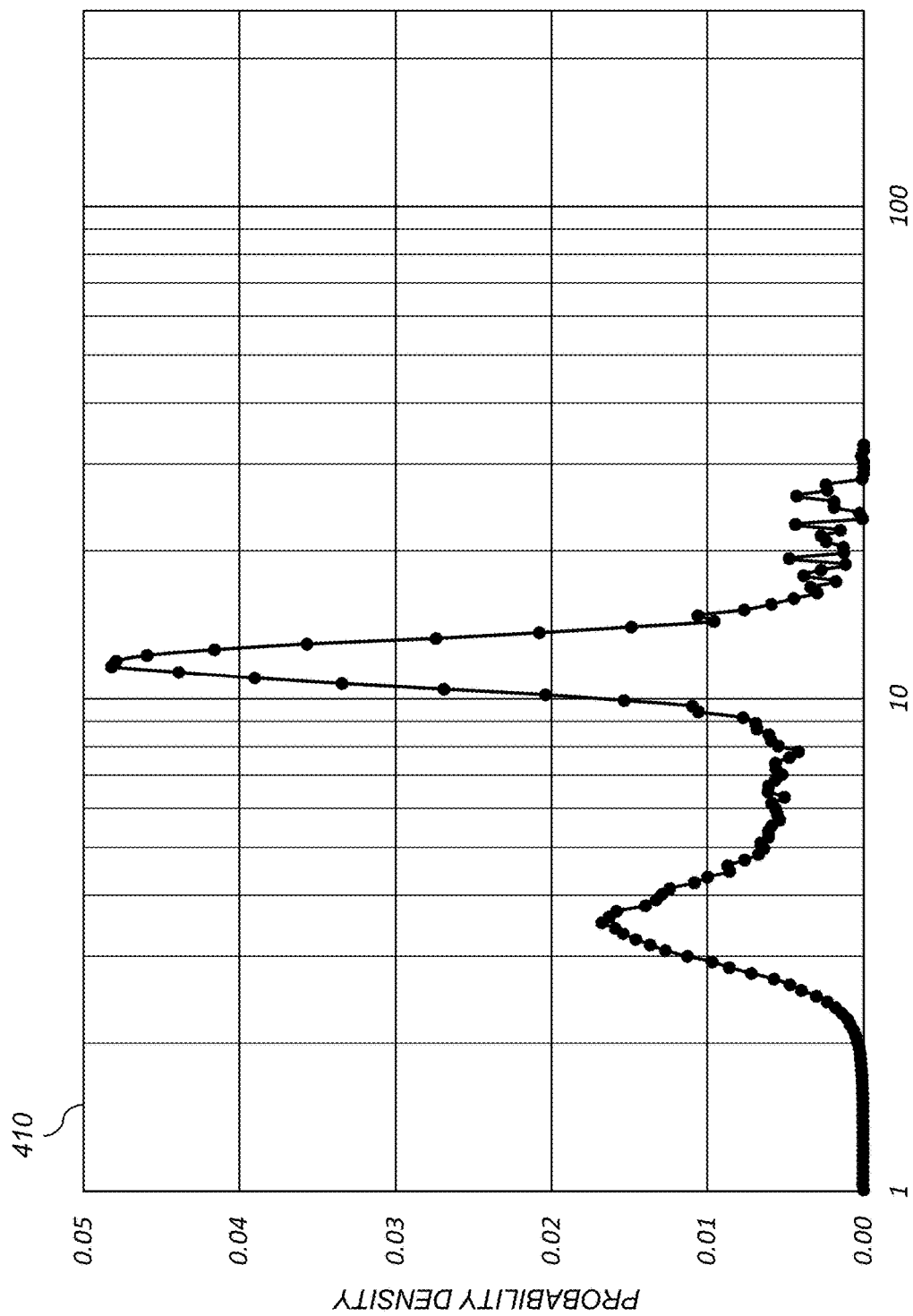
FIGS. 6A-6C are graphs illustrating multimodal particle size distribution functions having two, three and four modes for exemplary compositions of the present invention.
Figure 6B:
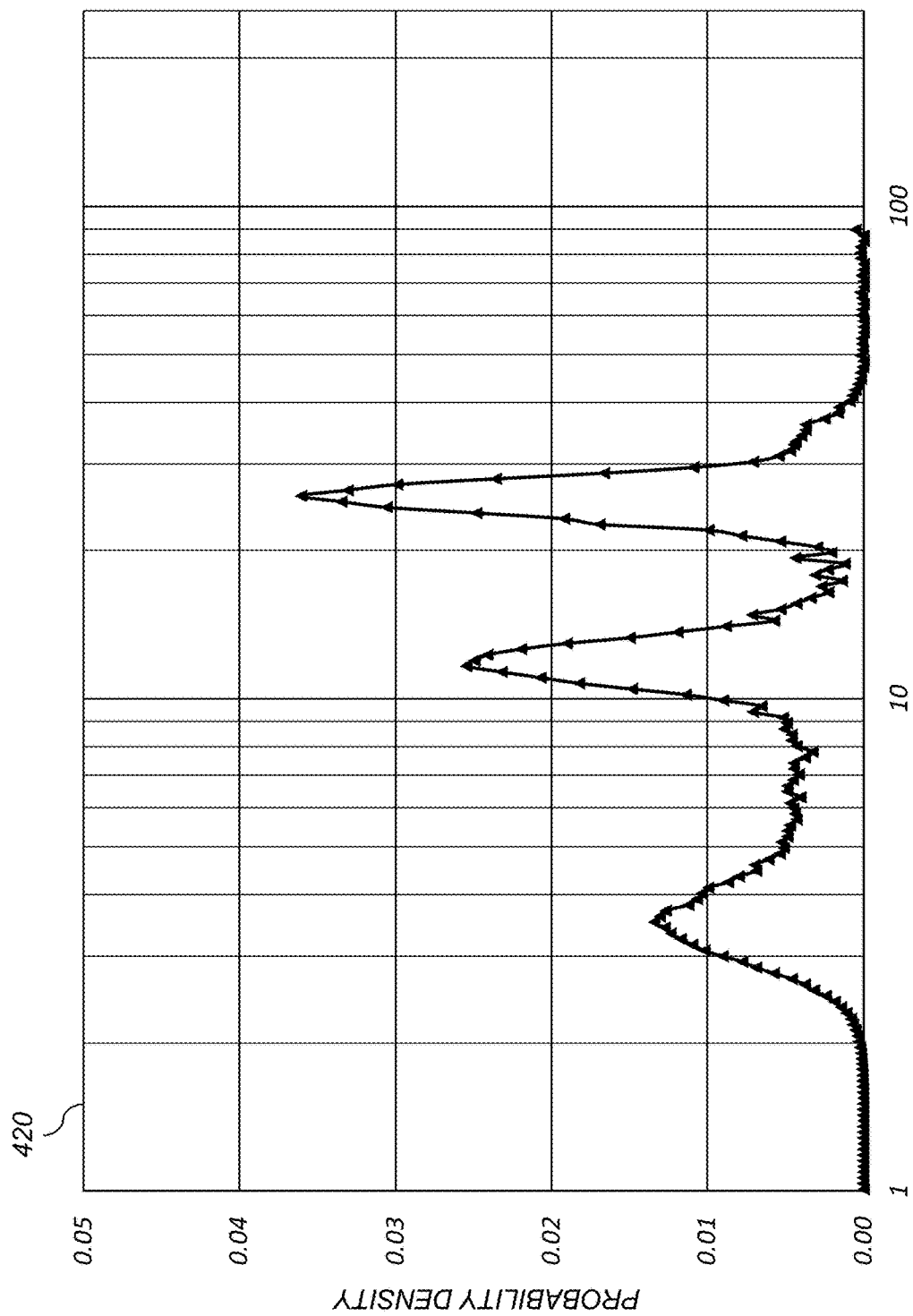
Figure 6C:
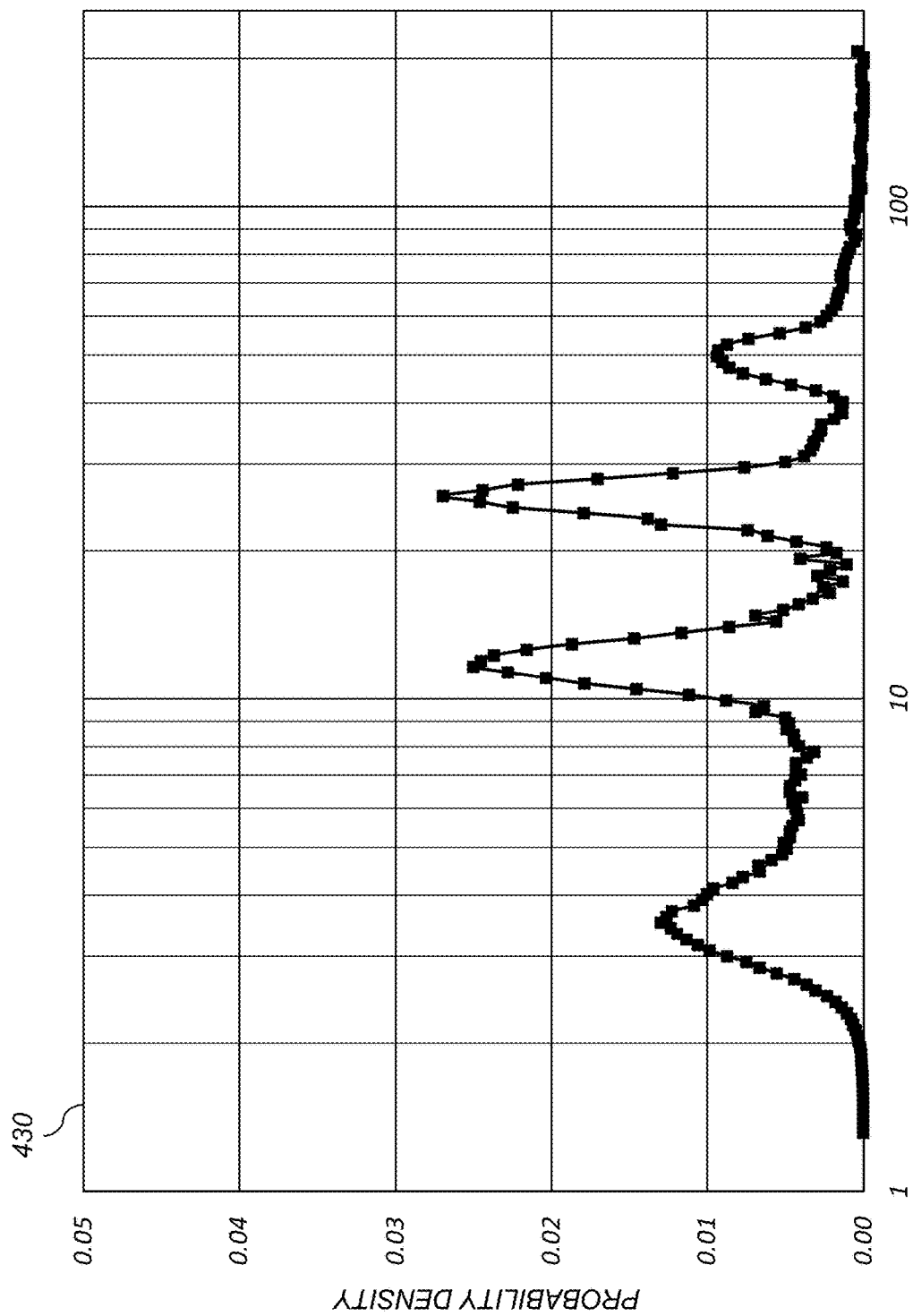

Inventive examples I2-I4 are matte surfaces obtained using coatings with multi-modal particle size distribution functions using two, three and four modes blade-coated on a 4 mil PET substrate. These examples demonstrate the improvement in the onset angle for grazing-incidence specular reflection that is obtained by increasing the number of modes in the multimodal distribution function. The binder in inventive examples I2-I4 is the same blend used for inventive example I1, with DMEA and surfactant added to improve coatability. All samples show low overall gloss performance as can be seen from the data in Table III. Additionally, it can be seen the onset angle for grazing-incidence specular reflection increases with higher numbers of modes, with measured values of 86.6°, 88.0° and 89.3°, respectively. FIG. 6A shows the bimodal particle size distribution function 410 for the low-specular-reflectance surface of inventive example I2; FIG. 6B shows the trimodal particle size distribution function 420 for the low-specular-reflectance surface of inventive example I3; and FIG. 6C shows the four-mode particle size distribution function 430 for the low-specular-reflectance surface of inventive example I4. Table IV contains the calculated parameters from the distribution functions shown in FIGS. 6A-6C. The valley percentage ratios were determined by first finding the minimum in the distribution function between adjacent mode peaks. The probability density in the valley was then divided by the probability densities of each of the peaks of the adjacent modes to determine the reported valley percentages.

TABLE IV

Analysis of Multimodal Distribution Functions

| | | I2 | I3 | I4 |
|---|---|---|---|---|
| Mode 1 | Particle Size (μm) | 3.52 | 3.52 | 3.52 |
| | Mode Width Parameter (WP) | 0.53 | 0.53 | 0.53 |
| | Volume % | 38% | 31% | 30% |
| | Particle Size Ratio $M_2:M_1$ | 3.31 | 3.31 | 3.31 |
| | Valley % $M_1$/% $M_2$ | 25%/9% | 24%/13% | 24%/13% |
| Mode 2 | Particle Size (μm) | 11.64 | 11.64 | 11.64 |
| | Mode Width Parameter (WP) | 0.33 | 0.34 | 0.34 |
| | Volume % | 62% | 34% | 33% |
| | Particle Size Ratio $M_3:M_2$ | | 2.22 | 2.22 |
| | Valley % $M_2$/% $M_3$ | | 5%/3% | 4%/4% |
| Mode 3 | Particle Size (μm) | | 25.84 | 25.84 |
| | Mode Width Parameter (WP) | | 0.28 | 0.28 |
| | Volume % | | 36% | 26% |
| | Particle Size Ratio $M_4:M_3$ | | | 1.93 |
| | Valley % $M_3$/% $M_4$ | | | 5%/14% |
| Mode 4 | Particle Size (μm) | | | 49.77 |
| | Mode Width Parameter (WP) | | | 0.33 |
| | Volume % | | | 12% |

Inventive example I5 has a trimodal particle size distribution where the particles in the first and second modes are the same as in inventive example I2. The coating composition of inventive example I5 was brush-coated on a sample of white flashing. In Table III the gloss of the white flashing was measured both without a coating (i.e., comparative example C3) and with a coating (i.e., inventive example I5). In addition to low gloss, the overall desired white color was maintained in inventive example I5.

Figure 7B:
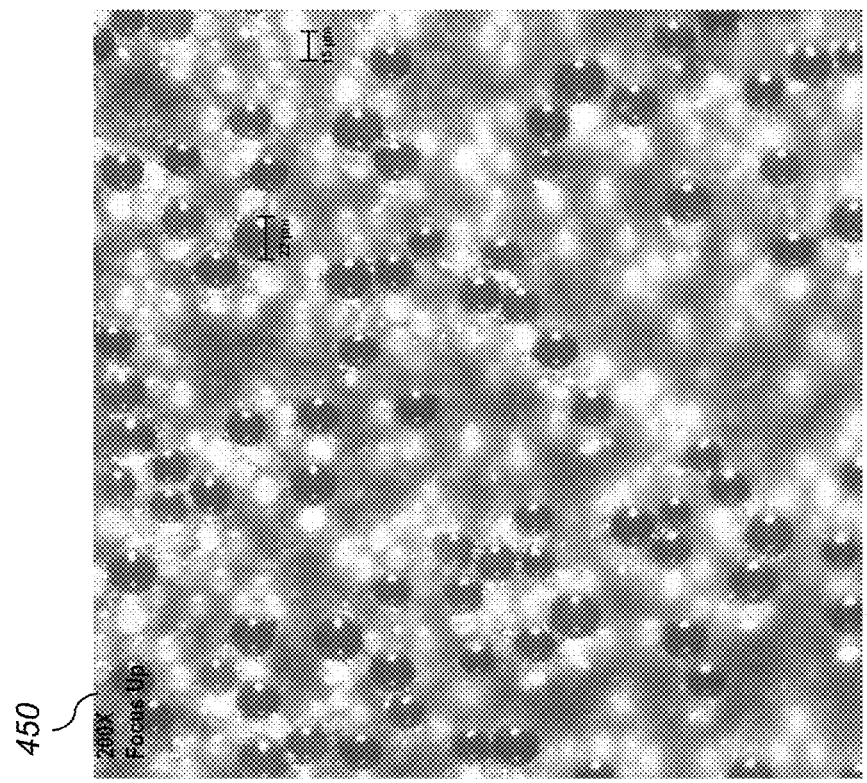
FIGS. 7A-7B are optical micrographs of a low-specular-reflectance surface according to an exemplary embodiment.
Figure 7A:
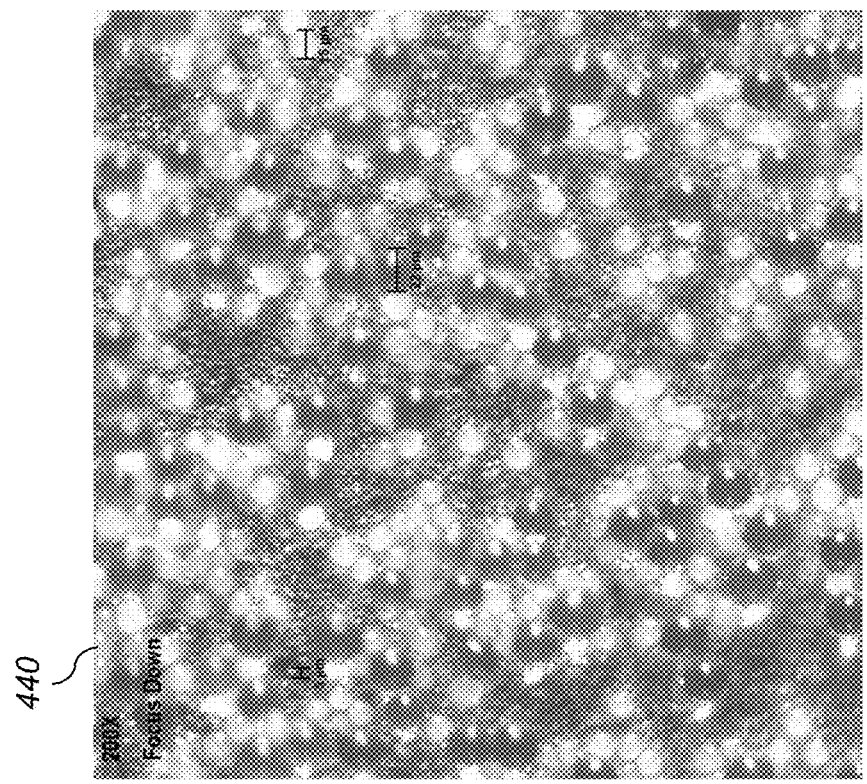

FIGS. 7A-7B are optical micrographs 440, 450 of a coating of the low-specular-reflectance coating composition of inventive example I5 illustrating the multimodal distribution of particles on the surface. The optical micrograph 440 FIG. 7A is focused at the lowest level of the coating, while the optical micrograph 450 of FIG. 7B is focused at the top surface of the coating.

Figure 8B:
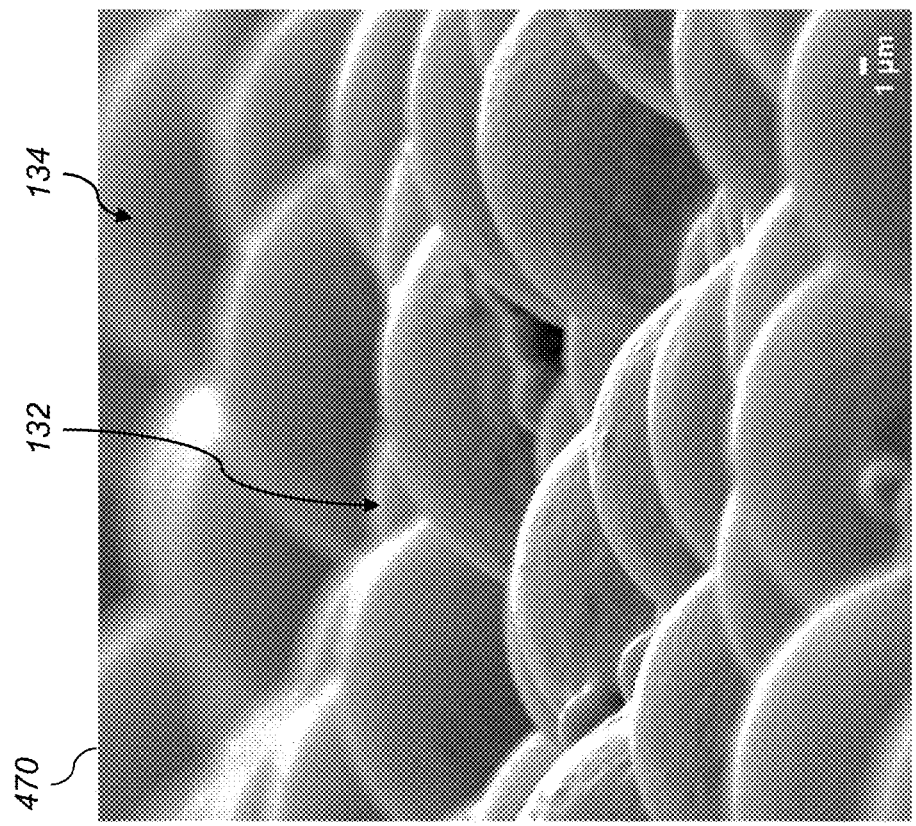
FIGS. 8A-8B are SEM images of a low-specular-reflectance surface according to an exemplary embodiment.
Figure 8A:
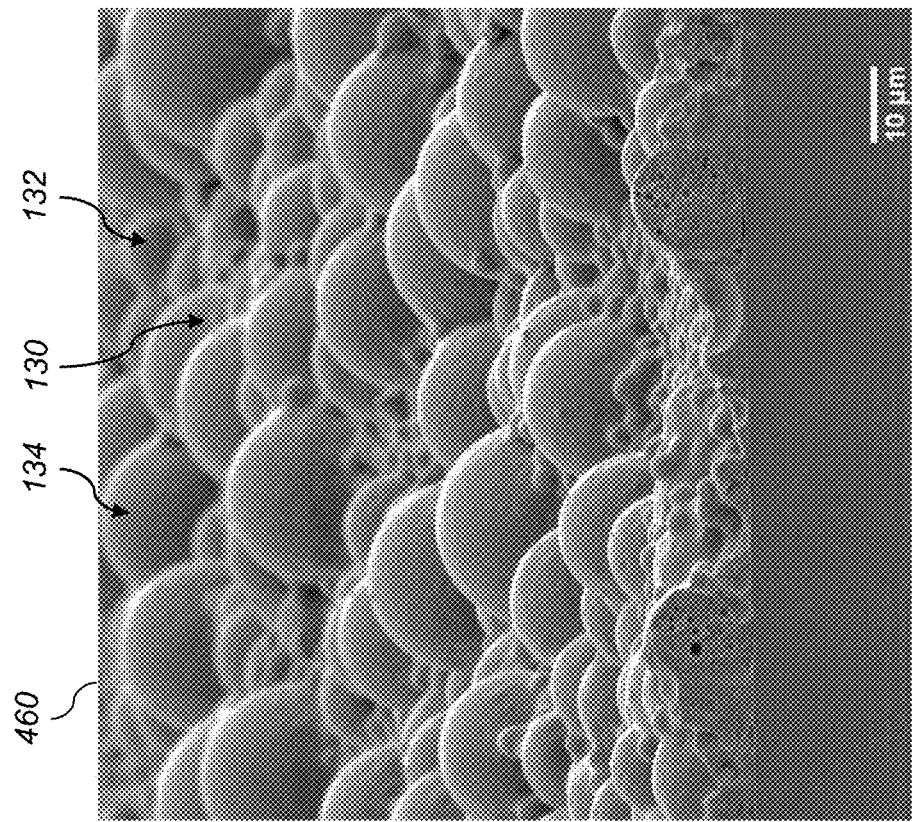

FIGS. 8A and 8B show SEM images 460, 470 of a coating of the low-specular-reflectance coating composition of inventive example I5 from a Scanning Electron Microscope with the stage set at 85° and 89°, respectively. FIGS. 8A-8B illustrates that the binder serves to adhere the particles to the surface without planarizing the coating providing a pattern of spherical caps 130, 132, 134. FIG. 8B illustrates how the large particles in the third mode (i.e., the mode having the largest mode particle size) effectively shield the particles in the first and second modes from incident light at high incidence angles. (Note that the BRDF data shown in FIG. 5 was measured from inventive example I5.)

Figure 9B:
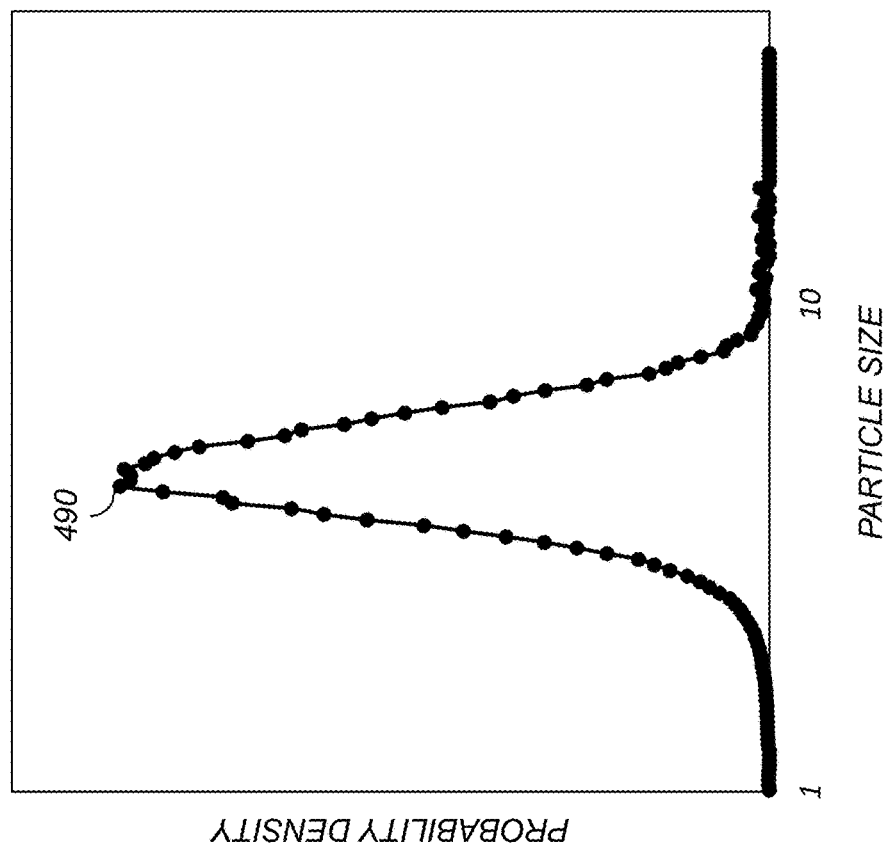
FIGS. 9A-9B are graphs showing particle size distributions for two batches of particles that are mixed to provide a combined batch of particles having a single-mode particle size distribution.
Figure 9A:
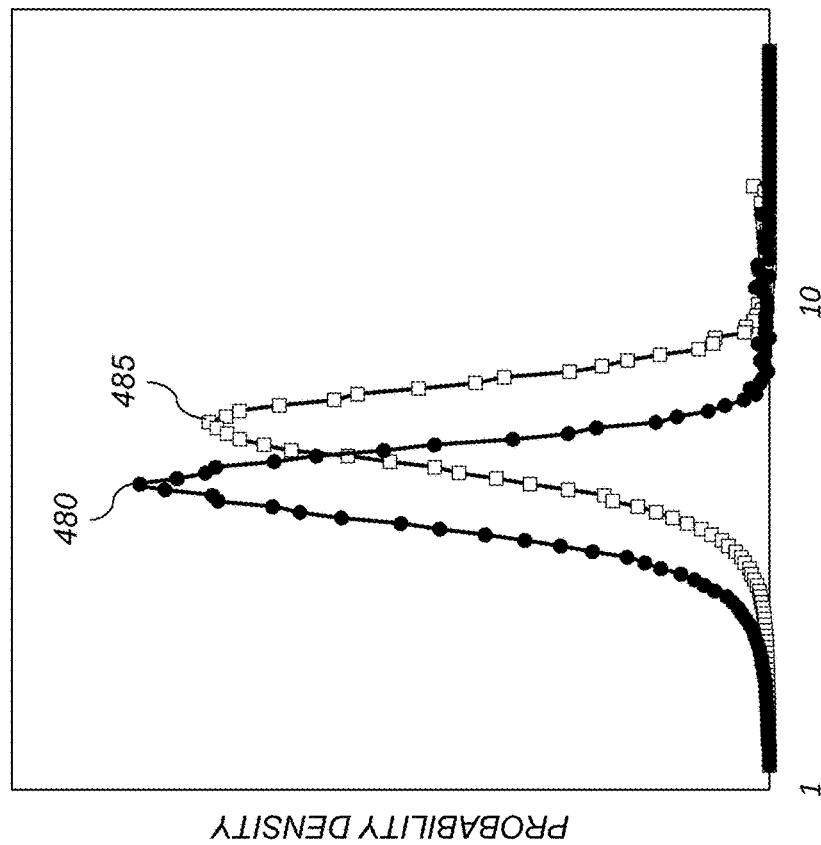

Inventive example I6 has a multimodal particle size distribution having three modes, where the particles in the modes 2 and 3 are the same as for inventive example I5. While inventive examples I1-I5 all employed transparent particles, inventive example I6 uses a blend of two different particles batches (P3 and P4) for mode 1 that have been dyed to include orange (particle batch P3) and black (particle batch P4) colorants. The relative amounts of the particle batches in mode 1 were 57.5 volume percent for particle batch P3 and 42.5 volume percent for particle batch P4. FIG. 9A illustrates the individual particle size distribution functions 480, 485 of particle batches P3 and P4, respectively. The combined particle size distribution function 490 for mode 1 is shown in FIG. 9B. It can be seen that while the particle sizes for the two particle batches differ slightly, the combined particle size distribution function 490 has a single mode due to the high degree of overlap. The addition of the colorant to the particles increases the opacity of the matte coating, allowing for better hiding and color matching.

Inventive example I6 also illustrates that colored and transparent particles may be used together to provide low-specular-reflectance surfaces having desired surface characteristics (e.g., color). Inventive example I6 has a brown appearance when coated on a brown flashing substrate. In Table III, the gloss of the brown flashing was measured both without a coating (i.e., comparative example C4) and with a coating (i.e., inventive example I6). In addition to low gloss, the overall desired brown color was maintained in inventive example I6.

As demonstrated by inventive example I6, in some embodiments one or more of the modes in the multimodal particle size distribution can correspond to a batch of particles including a mixture of two or more different types of particles. For example, the types of particles can differ in attributes such as color, transparency, material, porosity, and particle size distribution. The mixture of the different types of particles should produce a single mode particle size distribution having the attributes discussed earlier. The relative fractions of the different types of particles in the mixture can be used to control various attributes such as the color of the low-specular-reflectance surface.

Table III also lists measured gloss vales for additional comparative examples corresponding to commercially available materials. Comparative examples C3 and C4 are samples of white and brown flashing, respectively, corresponding to the substrates used for inventive examples I5 and I6. Comparative examples C5-C14 are commercially available matte aerosol spray paints. These paints were applied to a 4 mil PET substrate and measured to characterize their gloss. While some of these samples have exhibit low gloss at some incidence angles, it can be seen that none of them perform as well as the inventive samples across all incidence angles.

In addition to the low-specular-reflectance samples described above, samples formulated using ferrite were also generated. Narrow particle size distributions were achieved by sieving ferrite material obtained from PowderTech. The mode particle sizes used were 20, 40 and 80 microns, in the ration of 4:2:1 by weight. The ferrite particles were adhered to a substrate by precoating a binder (an inorganic-based paint: Rust-O-Leum 249340 High Heat Primer) onto the substrate and "dusting" the surface with the ferrite particle blend. The coated surface was cured using a curing process specified by the paint manufacturer. The observed specular reflectance of these surfaces was low. Alternatively, the ferrite particles could be formulated in more traditional paint or coating compositions as was illustrated with the polymeric particles, or can be attached to the substrate by any means known in the art.

The invention has been described in detail with particular reference to certain preferred embodiments thereof, but it will be understood that variations and modifications can be effected within the spirit and scope of the invention.

PARTS LIST 100 substrate
110 surface
112 incident light
114 reflected light
116 surface normal
118 local surface normal
120 surface
122 layer
124 surface structure
130 cap
132 cap
134 cap
140 particle
142 particle
144 particle
150 binder
200 multimodal particle size distribution
205 distribution function
210 mode
212 mode
214 mode
216 mode
300 first batch of particles
302 second batch of particles
304 third batch of particles
306 fourth batch of particles
308 binder
310 solvent
312 other ingredients
320 combine ingredients step
325 low-specular-reflectance coating composition
330 surface
335 apply composition to surface step
340 dry surface step
345 low-specular-reflectance surface
400 graph
402 diffuse reflectance
404 specular reflectance peak
410 distribution function
420 distribution function
430 distribution function
440 optical micrograph
450 optical micrograph
460 SEM image
470 SEM image
480 distribution function
485 distribution function
490 distribution function

The invention claimed is:

1. A low-specular-reflectance coating composition, comprising:
   a binder;
   a solvent; and
   a plurality of substantially spherical particles having a multimodal particle size distribution;
   wherein the multimodal particle size distribution has a distribution function having two or more modes, each mode having a peak defining an associated mode particle size, wherein the distribution function including a first mode having a first peak corresponding to a first particle size, and a second mode having a second peak corresponding to a second particle size;
   wherein a mode width parameter for each of the modes is less than or equal to 1.0, the mode width parameter for each mode being given by a ratio of a full-width half-maximum width of that mode to the particle size of that mode;
   wherein a ratio of the second particle size to the first particle size is between 1.7-4.0; and
   wherein a smallest of the mode particle sizes is greater than or equal to 1.0 microns, and a largest of the mode particle sizes is greater than or equal to 3.0 microns.

2. The low-specular-reflectance coating composition of claim 1, wherein a total volume of the substantially spherical particles in the first mode is between 20-70% of a total volume of all of the particles.

3. The low-specular-reflectance coating composition of claim 1, wherein a total volume of the substantially spherical particles in the second mode is between 20-70% of a total volume of all of the particles.

4. The low-specular-reflectance coating composition of claim 1, wherein the distribution function further includes a third mode having a third peak corresponding to a third particle size, and wherein a ratio of the third particle size to the second particle size is between 1.7-4.0.

5. The low-specular-reflectance coating composition of claim 4, wherein a total volume of the substantially spherical particles in the third mode is between 10-40% of a total volume of all of the particles.

6. The low-specular-reflectance coating composition of claim 4, wherein the distribution function further includes a fourth mode having a fourth peak corresponding to a fourth particle size, and wherein a ratio of the fourth particle size to the third particle size is between 1.7-4.0.

7. The low-specular-reflectance coating composition of claim 1, wherein the mode width parameter for each of the modes is less than or equal to 0.6.

8. The low-specular-reflectance coating composition of claim 1, wherein a minimum value of the distribution function between adjacent modes, of said two or more modes is no more than 50% of the peaks of the adjacent modes.

9. The low-specular-reflectance coating composition of claim 1, wherein a volume percent of the substantially spherical particles in the low-specular-reflectance coating composition is between 2-30 volume percent.

10. The low-specular-reflectance coating composition of claim 1, wherein a volume percent of the binder in the low-specular-reflectance coating composition is between 1-25 volume percent.

11. The low-specular-reflectance coating composition of claim 1, wherein a volume percent of the solvent in the low-specular-reflectance coating composition is between 45-97 volume percent.

12. The low-specular-reflectance coating composition of claim 1, wherein the first particle size is at least 2 microns.

13. The low-specular-reflectance coating composition of claim 1, wherein at least a portion of the substantially spherical particles are substantially transparent.

14. The low-specular-reflectance coating composition of claim 1, wherein at least a portion of the substantially spherical particles include a colorant.

15. The low-specular-reflectance coating composition of claim 1, wherein at least a portion of the substantially spherical particles are inorganic particles.

16. The low-specular-reflectance coating composition of claim 1, wherein at least a portion of the substantially spherical particles are polymeric particles.

17. The low-specular-reflectance coating composition of claim 1, wherein at least a portion of the substantially spherical particles are porous.

18. The low-specular-reflectance coating composition of claim 1, wherein the low-specular-reflectance coating composition is a paint formulation.

19. The low-specular-reflectance coating composition of claim 18, wherein the paint formulation is a spray paint or an aerosol paint.

20. The low-specular-reflectance coating composition of claim 1, wherein a volume percent of the binder in the low-specular-reflectance coating composition is less than a volume percent of the substantially spherical particles.

* * * * *